(12) United States Patent
Baek et al.

(10) Patent No.: US 12,273,294 B2
(45) Date of Patent: Apr. 8, 2025

(54) METHOD AND DEVICE FOR TERMINAL TO TRANSMIT POSITIONING REFERENCE SIGNAL IN WIRELESS COMMUNICATION SYSTEM SUPPORTING SIDELINK COMMUNICATION

(71) Applicant: LG Electronics Inc., Seoul (KR)

(72) Inventors: Jongseob Baek, Seoul (KR); Hanbyul Seo, Seoul (KR); Woosuk Ko, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/779,090

(22) PCT Filed: Dec. 4, 2020

(86) PCT No.: PCT/KR2020/017611
§ 371 (c)(1),
(2) Date: May 23, 2022

(87) PCT Pub. No.: WO2021/112610
PCT Pub. Date: Jun. 10, 2021

(65) Prior Publication Data
US 2022/0416976 A1    Dec. 29, 2022

(30) Foreign Application Priority Data

Dec. 6, 2019    (KR) ........................ 10-2019-0161585
Dec. 11, 2019    (KR) ........................ 10-2019-0164717

(51) Int. Cl.
*H04L 5/00*    (2006.01)
*H04W 72/0453*    (2023.01)
(Continued)

(52) U.S. Cl.
CPC .......... *H04L 5/0051* (2013.01); *H04L 5/0012* (2013.01); *H04W 72/0453* (2013.01); *H04W 72/20* (2023.01); *H04W 72/51* (2023.01)

(58) Field of Classification Search
CPC ............... H04L 5/0051; H04L 5/0012; H04W 72/0453; H04W 72/20; H04W 72/51
See application file for complete search history.

(56) References Cited

U.S. PATENT DOCUMENTS

2022/0110076 A1*    4/2022    Shimoda ........... H04W 72/0446
2024/0276442 A1*    8/2024    Shimoda ............... G01S 5/0218

FOREIGN PATENT DOCUMENTS

CN         109644455 A    4/2019

OTHER PUBLICATIONS

R1-1910783: 3GPP TSG RAN WG1 Meeting #98bis, Chongqing, China, Oct. 14-20, 2019, LG Electronics, "Discussion on physical layer procedures for NR sidelink," 23 Pages.
(Continued)

*Primary Examiner* — Donald L Mills
(74) *Attorney, Agent, or Firm* — BRYAN CAVE LEIGHTON PAISNER LLP

(57) ABSTRACT

Disclosed are a method and device for a first terminal to transmit a positioning reference signal (PRS) through a physical sidelink feedback channel (PSFCH) in a wireless communication system supporting sidelink communication according to various embodiments. Disclosed are a method and device, wherein the method comprises the steps of: allocating a first frequency resource region for a PRS within a resource region for the PSFCH so that the PRS is multiplexed with a feedback signal; transmitting allocation information on the first frequency resource region; and transmitting the PRS and the feedback signal through the PSFCH on the basis of the allocation information, wherein the size of
(Continued)

the first frequency resource region is determined on the basis of the size of a pre-configured frequency resource for the feedback signal and the type of the multiplexing, and the allocation information includes information on the multiplexing type, the size of the first frequency resource region, and the start frequency of the first frequency resource.

11 Claims, 23 Drawing Sheets

(51) Int. Cl.
     *H04W 72/20*     (2023.01)
     *H04W 72/51*     (2023.01)

(56) References Cited

OTHER PUBLICATIONS

R1-1910777: 3GPP TSG RAN WG1 #98bis, Chongqing, China Oct. 14-20, 2019, LG Electronics, "Discussion on physical layer structure for NR sidelink," 40 Pages.
R1-1912457:3GPP TSG RAN WG1 Meeting #99 Meeting, Reno, USA, Nov. 18-22, 2019, Samsung, "Feature lead summary#1 for agenda item 7.2.4.1 Physical Layer structure for sidelink," 32 Pages.
R1-1812984: 3GPP TSG RAN WG1 #95, Spokane, USA, Nov. 12-16, 2018, Samsung, "Discussion on physical layer structures for NR V2X," 10 pages.

* cited by examiner (a)

(b)

(a)

(b)

(a)

(b)

(c)

US 12,273,294 B2

METHOD AND DEVICE FOR TERMINAL TO TRANSMIT POSITIONING REFERENCE SIGNAL IN WIRELESS COMMUNICATION SYSTEM SUPPORTING SIDELINK COMMUNICATION

This application is the National Stage filing under 35 U.S.C. 371 of International Application No. PCT/KR2020/017611 filed on Dec. 4, 2020, which claims priority to Korean Patent Application Nos. 10-2019-0161585 filed on Dec. 6, 2019 and 10-2019-0164717 filed on Dec. 11, 2019, the contents of which are all hereby incorporated by reference herein in their entirety.

TECHNICAL FIELD

The present disclosure relates to a method of transmitting and receiving a positioning reference signal (PRS) by a user equipment through a sidelink feedback channel in a wireless communication system supporting sidelink, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Problem

An object to be achieved is to provide a method apparatus for transmitting a positioning reference signal (PRS) required for sidelink positioning by being multiplexed with a feedback signal in a limited physical sidelink feedback channel (PSFCH) resource and determining the size of a frequency resource region for the PRS and a multiplexing type in consideration of the relationship with the feedback signal transmitted through a PSFCH, so that the PSFCH resource is efficiently used.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

According to an aspect of the present disclosure, provided herein is a method of transmitting a positioning reference signal (PRS) by a first user equipment (UE) through a physical sidelink feedback channel (PSFCH) in a wireless communication system supporting sidelink communication, including allocating a first frequency resource region for the PRS so that the PRS is multiplexed with a feedback signal in a resource region for the PSFCH, transmitting allocation information about the first frequency resource region, and transmitting the PRS and the feedback signal through the PSFCH based on the allocation information. A size of the first frequency resource region may be determined based on a size of a preconfigured frequency resource for the feedback signal and on a multiplexing type, and the allocation information may include information about the multiplexing type, the size of the first frequency resource region, and a starting frequency of the first frequency resource.

The allocation information may be transmitted through a physical sidelink control channel (PSCCH) or may be transmitted by being piggybacked on a physical sidelink shared channel (PSSCH).

A plurality of first frequency resource regions may be allocated in the resource region for the PSFCH based on the multiplexing type of a comb type, and each of the plurality of first frequency resource regions may be separated from each other by a frequency size of a second frequency resource region allocated to the feedback signal in the resource region for the PSFCH.

Only one first frequency resource region may be allocated in the resource region for the PSFCH based on the multiplexing type of a burst type, and the first frequency resource region may be separated from a second frequency resource region allocated to the feedback signal by a preconfigured guard resource element in the resource region for the PSFCH.

The burst type may include a first burst type and a second burst type, and the first frequency resource region is allocated between second frequency resource regions based on the multiplexing type of the first burst type.

A PRS pattern identifier (ID) for the PRS may be determined based on at least one of a movement speed of the UE or a channel state related to the PSFCH.

Based on repeated transmission of the PRS by the UE, the PRS may be transmitted in the first frequency resource region which is frequency-hopped based on a preconfigured hopping pattern.

The preconfigured hopping pattern may be preconfigured based on a hopping pattern for the feedback signal.

The slot may further include a guard OFDM symbol between the request PRS resource pool and the response PRS resource pool.

In another aspect of the present disclosure, provided herein is a method of transmitting a positioning reference signal (PRS) by a first user equipment (UE) through a physical sidelink feedback channel (PSFCH) in a wireless communication system supporting sidelink communication, including allocating a first frequency resource region for the PRS so that the PRS is multiplexed with a feedback signal in a resource region for the PSFCH, transmitting allocation information about the first frequency resource region, and transmitting the PRS and the feedback signal through the PSFCH based on the allocation information. A size of the first frequency resource region may be determined based on a size of a preconfigured frequency resource for the feedback signal and on a multiplexing type, and a PRS pattern identifier (ID) for the PRS may be determined based on the size of the preconfigured frequency resource and a movement speed of the UE.

In another aspect of the present disclosure, provided herein is a method of receiving a positioning reference signal (PRS) by a second user equipment (UE) through a physical sidelink feedback channel (PSFCH) in a wireless communication system supporting sidelink communication, including receiving allocation information about a first frequency resource region allocated for the PRS in a resource region for the PSFCH, and receiving the PRS multiplexed with a feedback signal in a frequency region based on the allocation information. The allocation information may include information about a size of the first frequency resource region, determined based on a size of a preconfigured frequency resource for the feedback signal and on a multiplexing type, and information about the multiplexing type and a starting frequency of the first frequency resource.

Based on repeated transmission of the PRS on different time resources, the second UE may determine the number of PRBs to be combined based on a movement speed or a channel state related to the PSFCH.

In another aspect of the present disclosure, provided herein is a first user equipment (UE) for transmitting a positioning reference signal (PRS) through a physical sidelink feedback channel (PSFCH) in a wireless communication system supporting sidelink communication, including a radio frequency (RF) transceiver, and a processor connected to the RF transceiver. The processor may allocate a first frequency resource region for the PRS so that the PRS is multiplexed with a feedback signal in a resource region for the PSFCH, and control the RF transceiver to transmit allocation information about the first frequency resource region and to transmit the PRS and the feedback signal through the PSFCH based on the allocation information. A size of the first frequency resource region may be determined based on a size of a preconfigured frequency resource for the feedback signal and on a multiplexing type, and the allocation information may include information about the multiplexing type, the size of the first frequency resource region, and a starting frequency of the first frequency resource.

In another aspect of the present disclosure, provided herein is a second user equipment (UE) for receiving a positioning reference signal (PRS) through a physical sidelink feedback channel (PSFCH) in a wireless communication system supporting sidelink communication, including a radio frequency (RF) transceiver, and a processor connected to the RF transceiver. The processor may control the RF transceiver to receive allocation information about a first frequency resource region allocated for the PRS in a resource region for the PSFCH and to receive, through the PSFCH, the PRS multiplexed with a feedback signal in a frequency region based on the allocation information. The allocation information may include information about a size of the first frequency resource region, determined based on a size of a preconfigured frequency resource for the feedback signal and on a multiplexing type, and information about the multiplexing type and a starting frequency of the first frequency resource.

In another aspect of the present disclosure, provided herein is a chipset for transmitting a positioning reference signal (PRS) through a sidelink feedback channel (PSFCH) in a wireless communication system supporting sidelink, including at least one processor, and at least one memory operably connectable to the at least one processor and causing, when executed, the at least one processor to perform operations. The operations may include allocating a first frequency resource region for the PRS so that the PRS is multiplexed with a feedback signal in a resource region for the PSFCH, transmitting allocation information about the first frequency resource region, and transmitting the PRS and the feedback signal through the PSFCH based on the allocation information. A size of the first frequency resource region may be determined based on a size of a preconfigured frequency resource for the feedback signal and on a multiplexing type, and the allocation information may include information about the multiplexing type, the size of the first frequency resource region, and a starting frequency of the first frequency resource.

The processor may control a traveling mode of a device connected to the chipset based on the size of the first frequency resource region.

In another aspect of the present disclosure, provided herein is a computer-readable storage medium including at least one computer program that causes at least one processor to transmit a positioning reference signal (PRS) through a sidelink feedback channel (PSFCH) in a wireless communication system supporting sidelink. The at least one computer program may cause the at least one processor to perform operations for transmitting the PRS, and the computer-readable storage medium may store the at least one computer program. The operations may include allocating a first frequency resource region for the PRS so that the PRS is multiplexed with a feedback signal in a resource region for the PSFCH, transmitting allocation information about the first frequency resource region, and transmitting the PRS and the feedback signal through the PSFCH based on the allocation information. A size of the first frequency resource region may be determined based on a size of a preconfigured frequency resource for the feedback signal and on a multiplexing type. The allocation information may include information about the multiplexing type, the size of the first frequency resource region, and a starting frequency of the first frequency resource.

Advantageous Effects

According to various embodiments, a positioning reference signal (PRS) required for sidelink positioning may be transmitted by being multiplexed with a feedback signal in a limited physical sidelink feedback channel (PSFCH) resource, and the size of a frequency resource region for the PRS and a multiplexing type may be determined in consideration of the relationship with the feedback signal transmitted through a PSFCH, so that the PSFCH resource is efficiently used.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
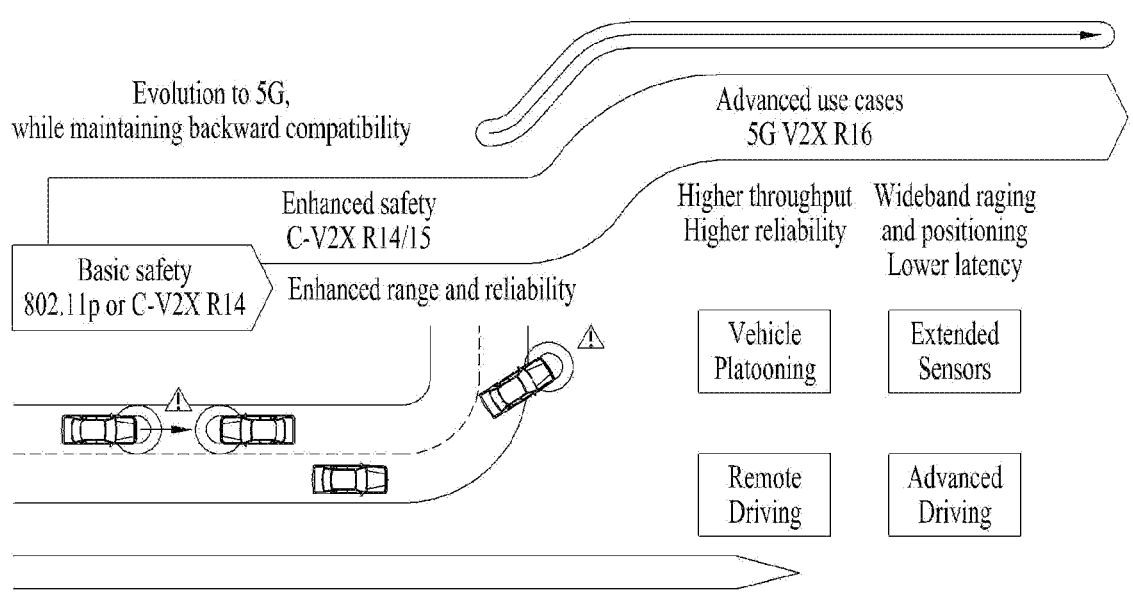
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (B S). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. IEEE 802.16m is an evolution of IEEE 802.16e and provides backward compatibility with a system based on IEEE 802.16e. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
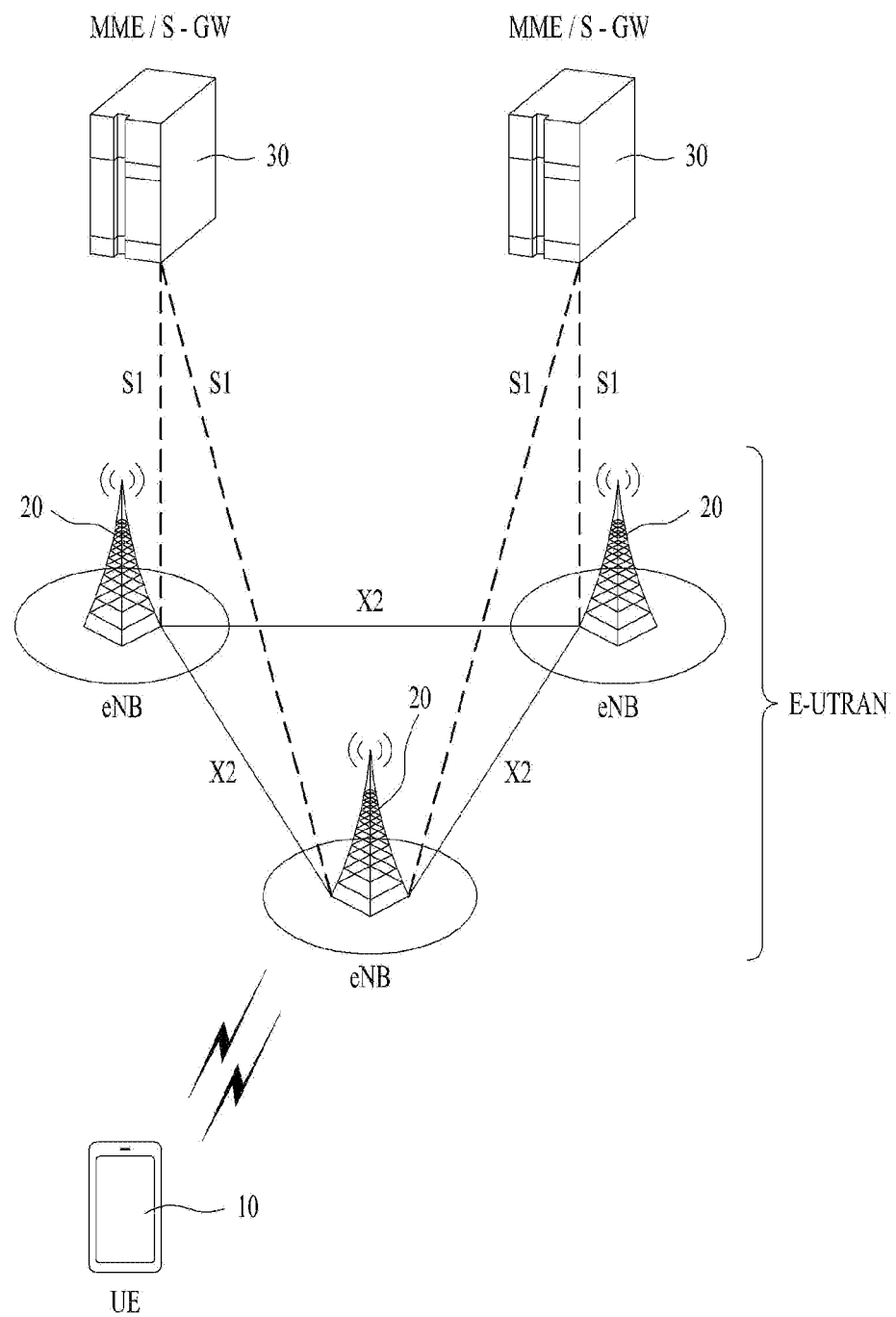
FIG. 2 illustrates the structure of an LTE system.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
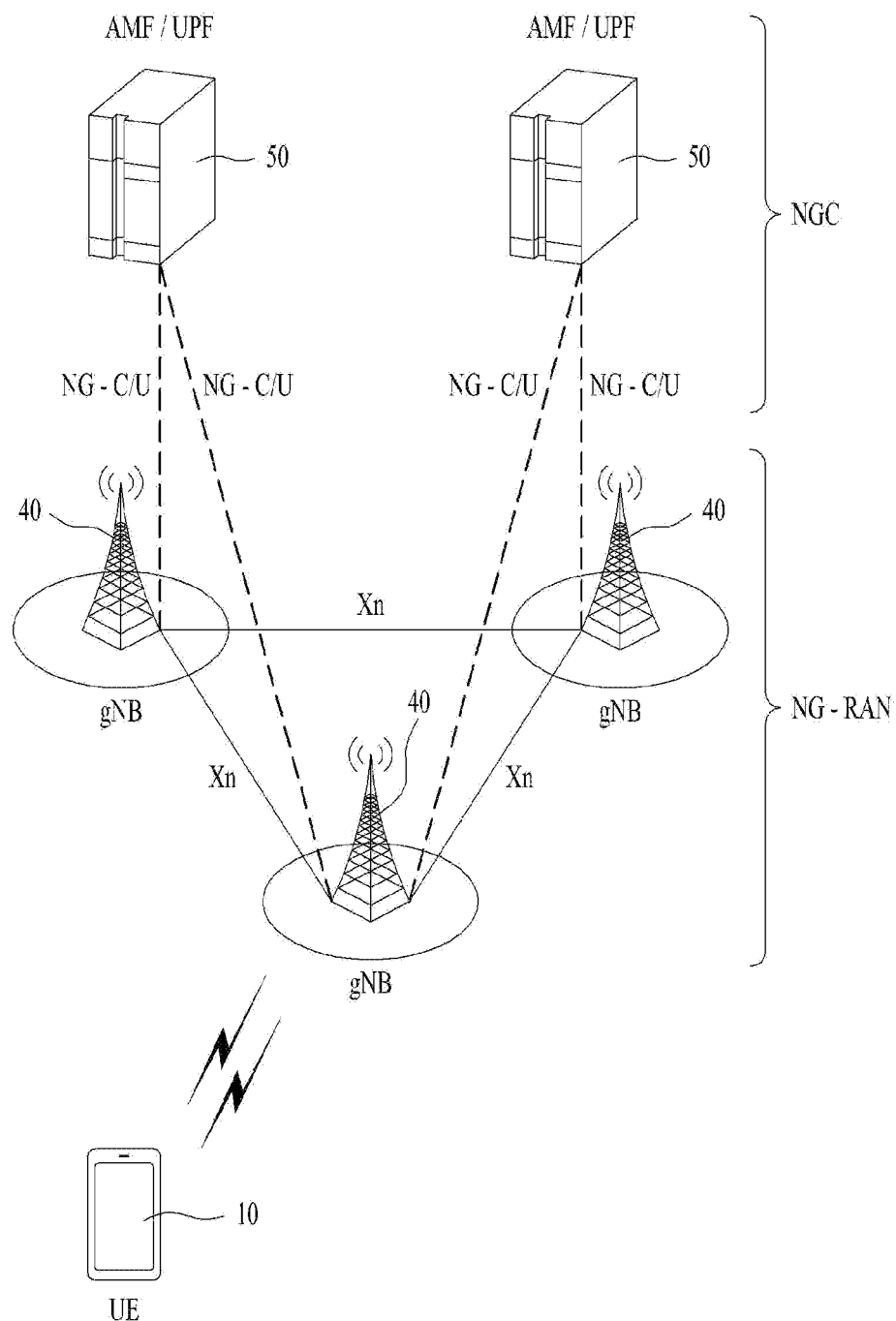
FIG. 3 illustrates the structure of an NR system.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
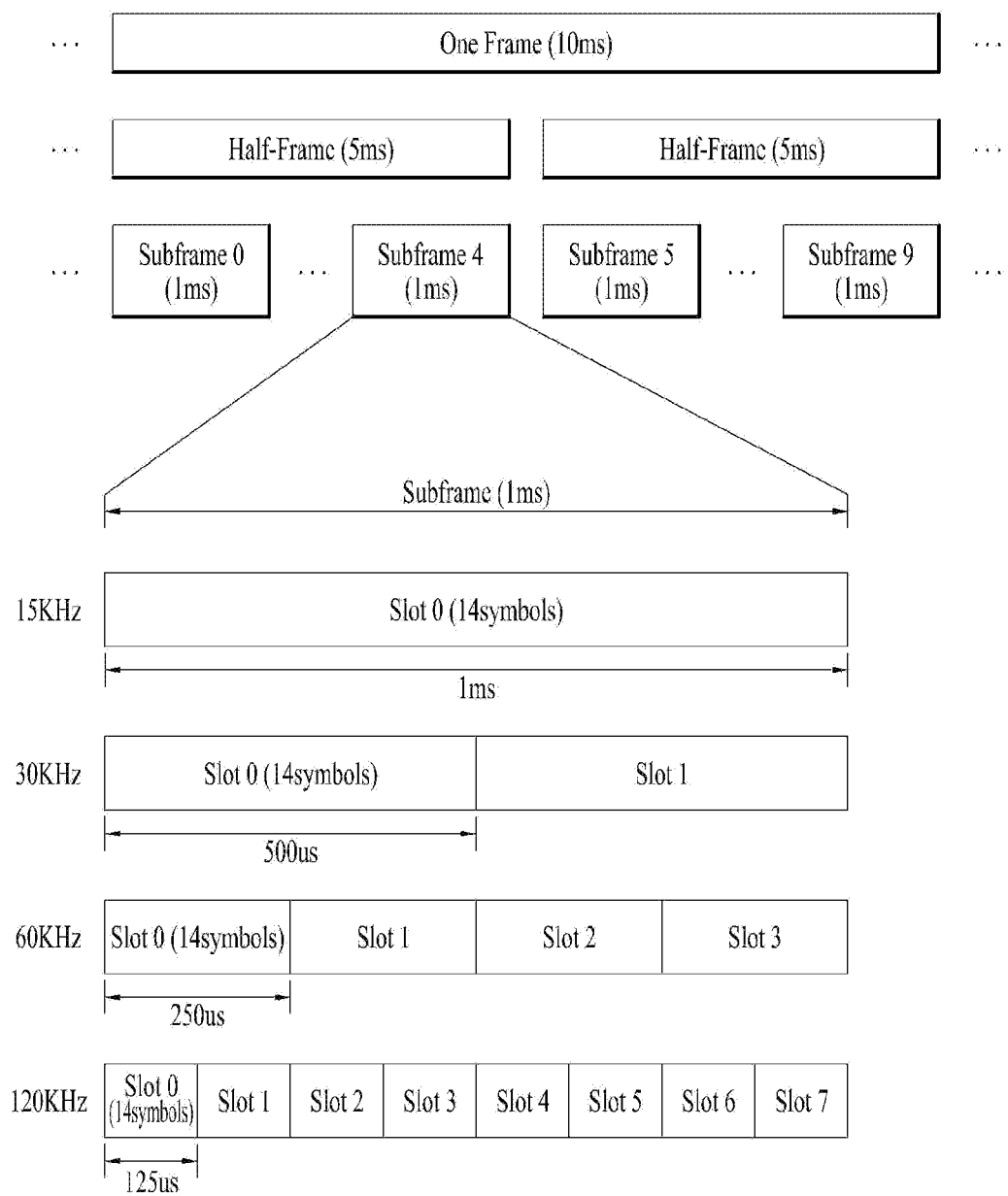
FIG. 4 illustrates the structure of an NR radio frame.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot ($N^{slot}_{symb}$), the number of slots per frame ($N^{frame,u}_{slot}$), and the number of slots per subframe ($N^{subframe,u}_{slot}$) according to an SCS configuration μ in the NCP case.

TABLE 1

| SCS (15*2^u) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
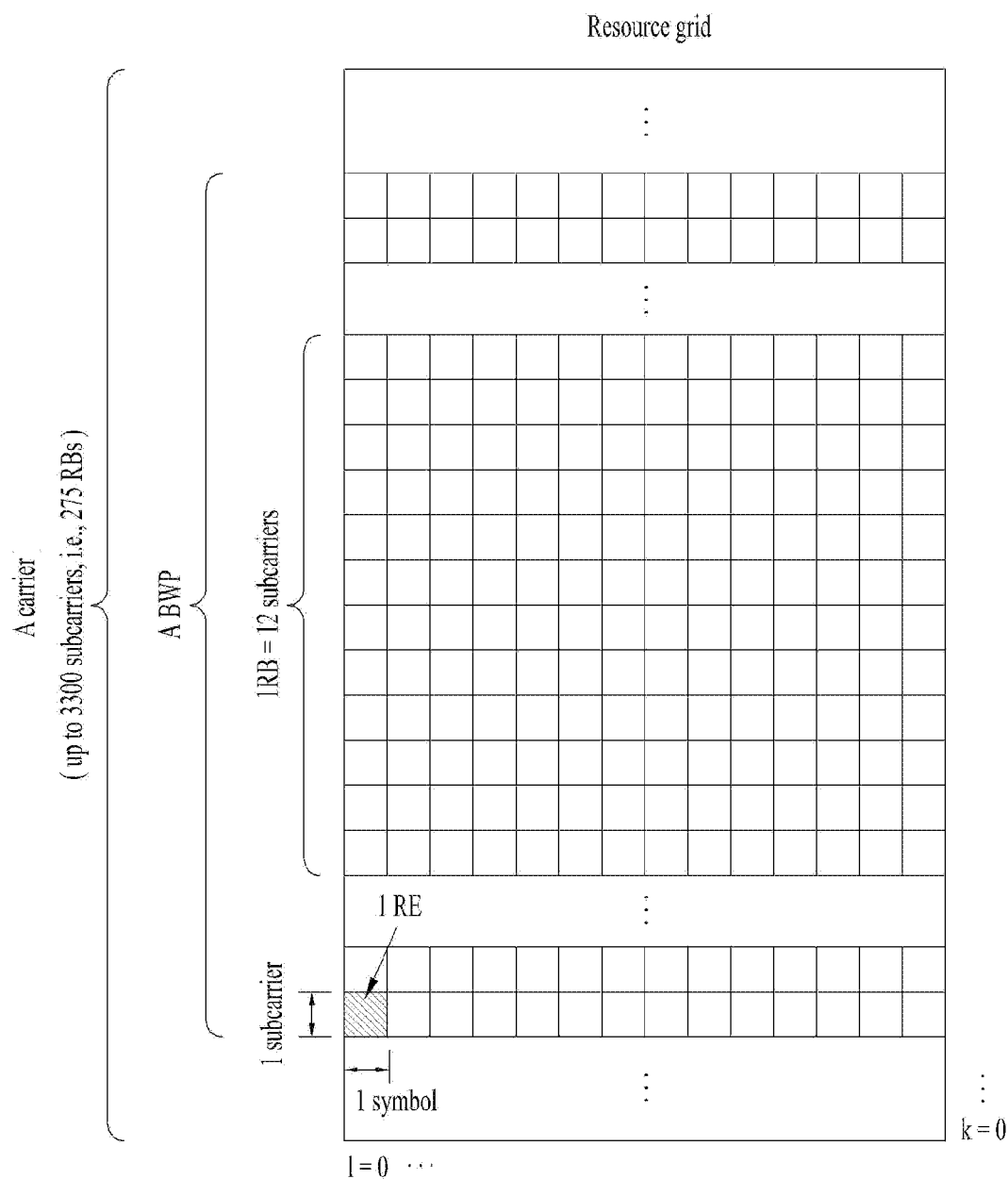
FIG. 5 illustrates the slot structure of an NR frame.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
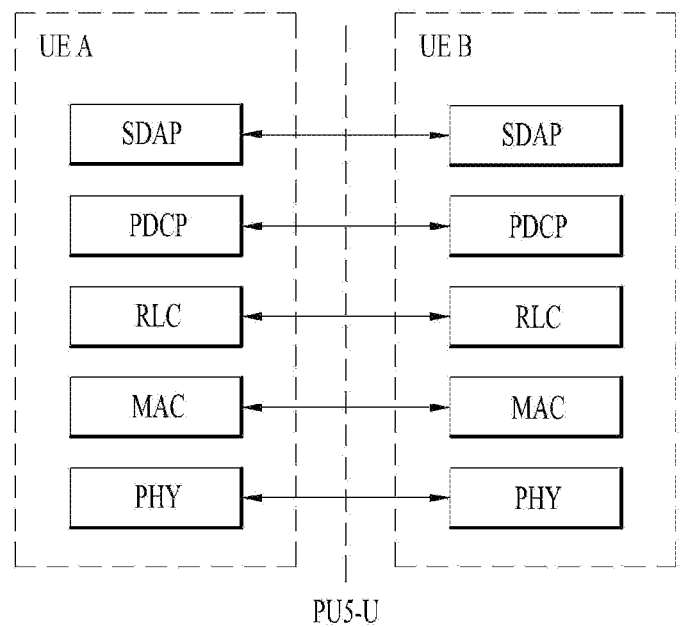
FIG. 6 illustrates a radio protocol architecture for SL communication.
Figure 6:
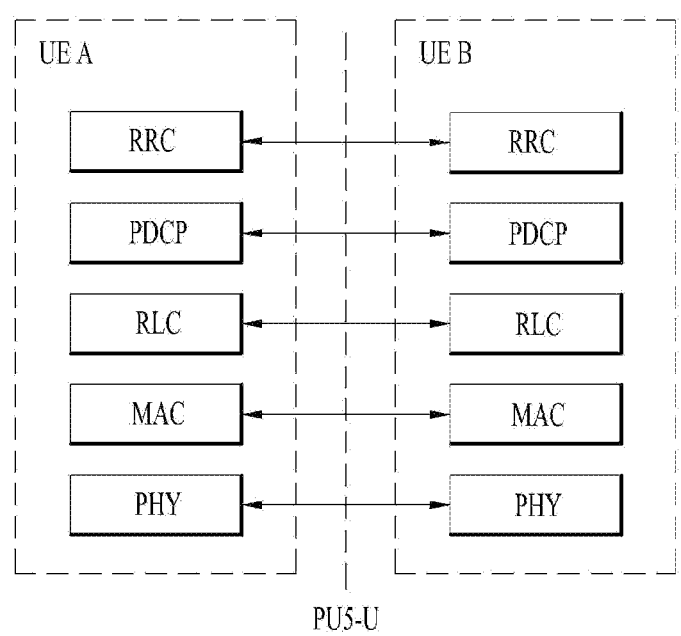

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
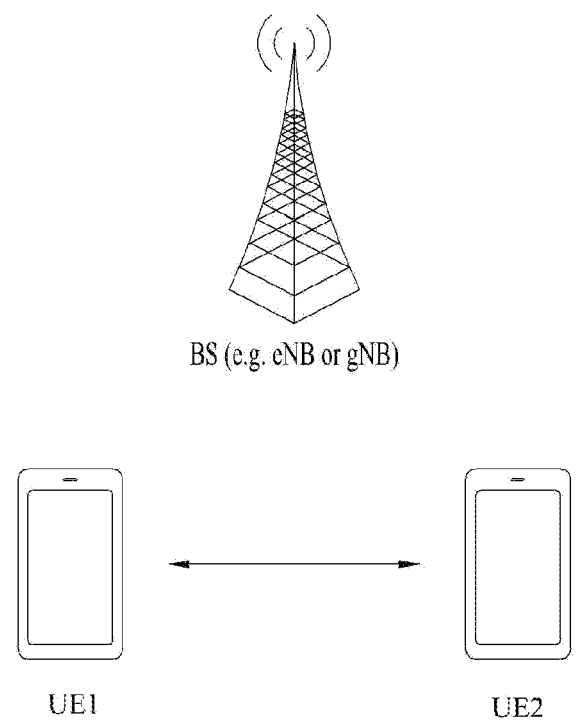
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
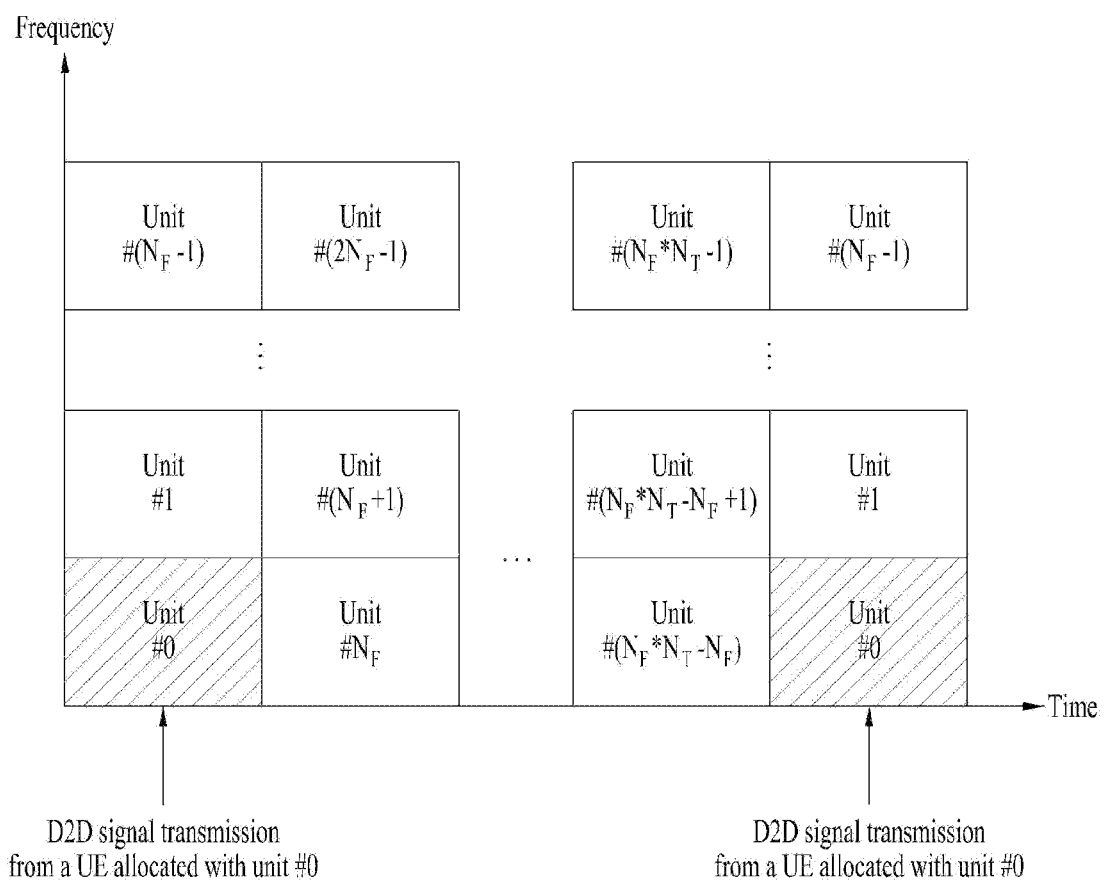
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
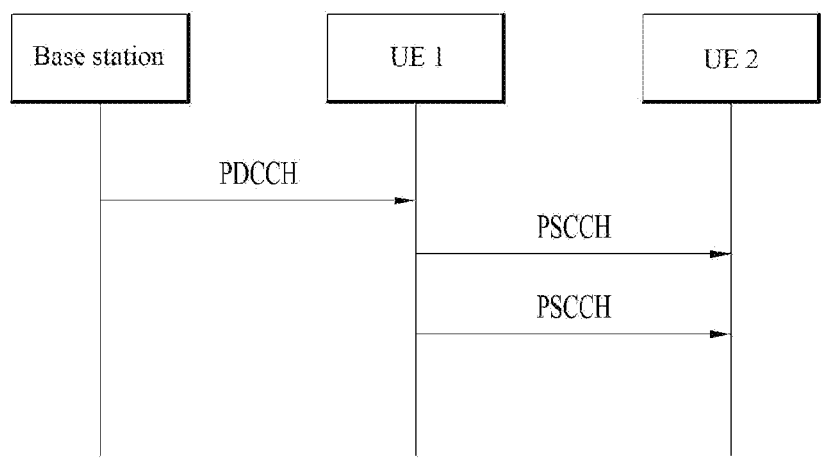
FIG. 9 illustrates a procedure in which UEs perform V2X or SL communication according to a transmission mode.
Figure 9:
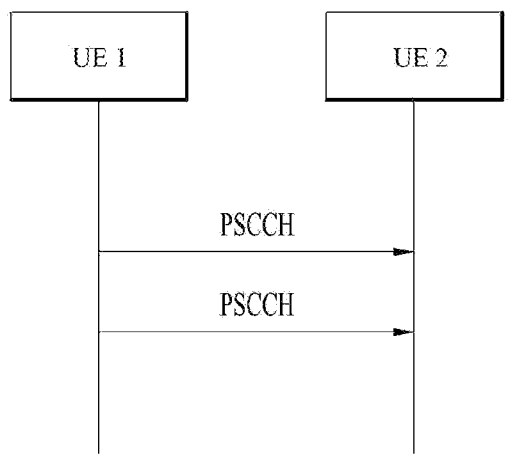

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Figure 10:
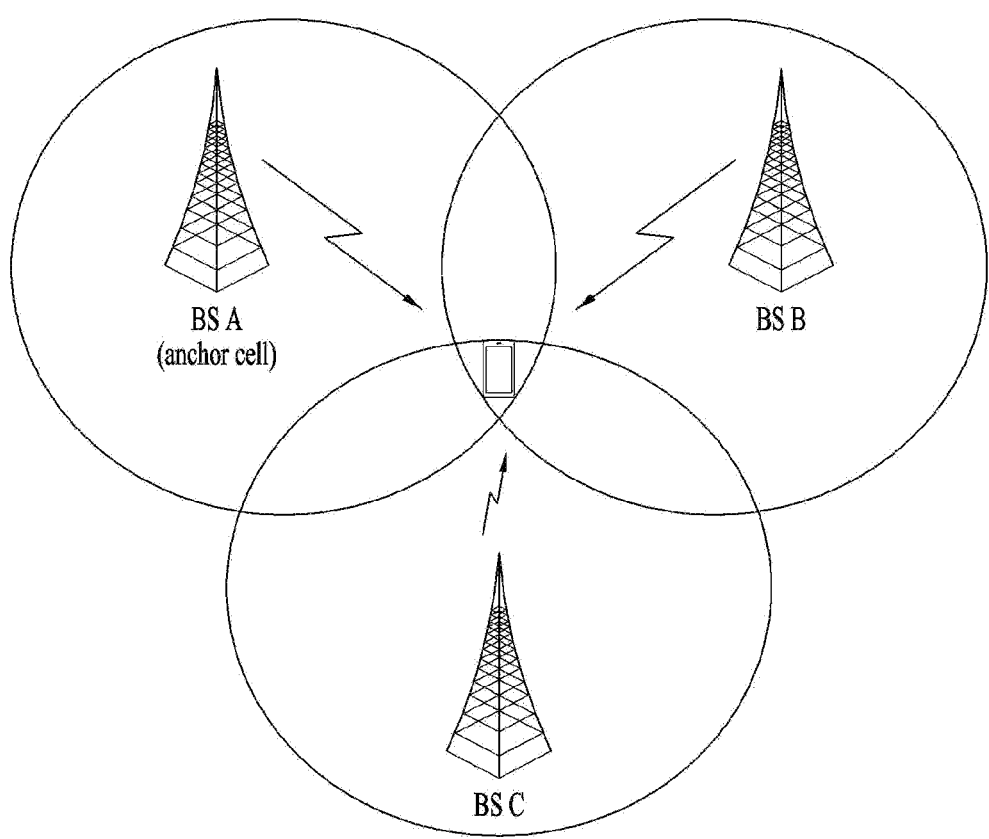
FIG. 10 illustrates an Observed Time Difference Of Arrival (OTDOA) positioning method to which the present disclosure is applicable.

FIG. 10 is a diagram illustrating an OTDOA positioning method according to an embodiment of the present disclosure.

In the OTDOA positioning method, a UE utilizes measurement timings of DL signals received from multiple TPs including an eNB, an ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is, the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the times of arrival (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 1]

Here, 'c' is the speed of light, {xt, yt} is the (unknown) coordinates of the target UE, {xi, yi} is the coordinates of a (known) TP, and {x1, y1} is the coordinates of a reference TP (or another TP). (Ti–T1) is a transmission time offset between the two TPs, which may be referred to as "real time difference" (RTD), and 'ni' and 'n1' may represent values related to UE TOA measurement errors.

E-CID (Enhanced Cell ID): In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA Rx-Tx time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB Rx-Tx time difference, timing advance (TADV), and angle of arrival (AoA).

TADVs may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

UTDOA (Uplink Time Difference of Arrival): UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

In a legacy NR system, location information of the UE has been measured and acquired through infrastructure, such as a BS or a global positioning system (GPS), that provides absolute location information such as observed time difference of arrival (OTDOA), UTDOA, and/or multi-cell round trip time (multi-RTT). However, this infrastructure-based method of measuring the location of the UE has difficulty in securing a line-of-sight (LOS) between the UE and the BS (or GPS) in a tunnel or a city center in which high-rise buildings are dense or performing operation in an environment in which the UE is out of infrastructure coverage or in which there is no infrastructure.

Therefore, research has been extensively conducted to measure and acquire relative location information of a UE, by, for example, a sensor, in an environment in which it is difficult to obtain the absolute location information of the UE, and then apply the relative location information to various services. For example, in future autonomous vehicles (or robots), etc., relative location information between vehicles may be effectively used to prevent collision between vehicles by causing a traveling vehicle to recognize existence of nearby vehicles and to secure a safe distance with the nearby vehicles.

However, conventional positioning is performed such that a positioning UE acquires signals and information necessary for relative position measurement of a neighboring UE through a handshake process with the neighboring UE, thereby having difficulty in being effectively applied to various collision scenarios that may arise between UEs such as vehicles moving at high speed. Therefore, it is necessary to study a procedure of performing fast on-demand relative positioning.

Hereinafter, a method for the positioning UE to measure a relative location of a neighboring UE through sidelink in an NR-V2X system will be described. The method of measuring the relative location of the neighboring UE may include a method in which the positioning UE measures a distance with the neighboring UE and a method of measuring a direction in which the neighboring UE is located based on the positioning UE. Such relative location information of the neighboring UE may be effectively used in preventing collision between UEs by causing, for example, a sensor, to recognize presence of the neighbor UE and to secure a safe distance with the neighboring UE in an environment in which it is difficult to obtain absolute position/location information of the neighboring UE. The positioning UE and/or the neighboring UE may be a mobile device, a V2X module, an IoT device, and the like. As such, the relative location information of the UE may be usefully used in various systems for mmWave communication, licensed band communication, unlicensed communication, intelligent transport systems (ITS) band communication, etc.

PSFCH Resource Allocation for PRS in NR-V2X Positioning

A positioning reference signal (PRS) required for SL positioning in SL NR-V2X may be transmitted through a physical sidelink feedback channel (PSFCH). To this end, a multiplexing and resource allocation method for efficiently using a limited PSFCH resource or resource region to transmit NR-V2X feedback information and the PRS will be proposed hereinbelow. In addition, in order to maximize SL positioning performance and PRS transmission efficiency, a method of allocating only a resource for PRS transmission without allocating a resource for NR-V2X feedback information transmission will be proposed.

In the following description, a PSFCH-feedback resource (a PSFCH resource for feedback information) includes a time, frequency, and/or code resource, allocated for transmission of feedback information or feedback signals, such as acknowledgement (ACK)/negative acknowledgement (NACK)-HARQ and/or channel state information (CSI), and a PSFCH-PRS resource (a PSFCH resource for the PRS) includes a time, frequency, and/or code resource allocated for transmission of the PRS.

Table 5 shows Release-16 agreement related to the PSFCH.

TABLE 5

- For signaling frequency resources of actual PSFCH transmission, down select one of followings:
  o Bitmap indicates RBs in a resource pool
- Repetition of PSFCH format 0 (one-symbol PSFCH format agreed in RAN1#97) to two consecutive symbols is used.
  o This implies that, two consecutive symbols are always used for transmission of PSFCH format 0.
  o Note: The first symbol can be used for AGC training.
- For the agreed sequence-based PSFCH format with one symbol (not including AGC training period),
  o 1 PRB is used.
  o Only 1 bit can be carried for the case of N = 1, where N denotes the period of slot having PSFCH resource in a resource pool,
- For the period of N slot(s) of PSFCH resource, N = 2 and N = 4 are additionally supported.
- 1st SCI includes at least
  o Priority (QoS value),
  o PSSCH resource assignment (frequency/time resource for PSSCH), TABLE 5-continued

- Resource reservation period (if enabled),
- PSSCH DMRS pattern (if more than one patterns are (pre-)configured),
- 2nd SCI format (e.g. information on the size of 2nd SCI),
- [2]-bit information on amount of resources for 2nd SCI (e.g. beta offset or aggregation level)
  - 1st stage SCI indicates that PSSCH REs are occupied by 2nd stage SCI
- Number of PSSCH DMRS port(s)
- 5-bit MCS
- FFS on some part of destination ID (Pre-)configuration indicates the time gap between PSFCH and the associated PSSCH for Mode 1 and Mode 2.

System information and sidelink positioning control information (SPCI), necessary for performing SL positioning using the PSFCH, may be included in a system information block (SIB) transmitted through a PSBCH, 1st-stage SCI transmitted through a PSCCH, and/or a 2nd-stage SCI transmitted through a PSSCH.

In this case, a PSFCH-PRS resource configuration and operation method and PRS-related information that may be transmitted in the SIB, the 1st-stage SCI, and/or the 2nd-stage SCI may be provided or configured in the following manner. The PSFCH-PRS resource may be a resource or resource region allocated for the PRS through the PSFCH and may correspond to a PSFCH-PRS resource region. The PSFCH-feedback resource may be a resource region allocated for transmission of feedback information through the PSFCH and may correspond to a PSFCH-feedback resource region.

PSFCH-PRS resource on/off may indicate whether the PSFCH-PRS resource for SL positioning is allocated. If the PSFCH-PRS resource is on ("1"), this may indicate that the PSFCH-PRS resource (or PSFCH-PRS resource region) for SL positioning has been allocated to the PSFCH. If the PSFCH-PRS resource is off ("0"), this may indicate that the PSFCH-PRS resource (or PSFCH-PRS resource region) for SL positioning has not been allocated.

A PSFCH-PRS multiplexing type may indicate how the PSFCH-PRS resource (or PSFCH-PRS resource region) is multiplexed with the PSFCH-feedback resource (or PSFCH-feedback resource region). Specifically, a comb type represents a structure in which the PSFCH-PRS resource (or PSFCH-PRS resource region) is multiplexed with the PSFCH-feedback resource (or PSFCH-feedback resource region) in a comb form. A burst-type represents a structure in which the PSFCH-PRS resource is multiplexed with the PSFCH-feedback resource in a burst form. No-multiplexing represents a structure in which the PSFCH-PRS resource fully occupies a PSFCH resources without allocating the PSFCH-feedback resource.

A PSFCH resource period N indicates a period (e.g., N=1, 2, 4) at which the PSFCH is allocated based on a logical slot or a physical slot.

A PSFCH-PRS resource allocation period may be defined and configured based on a physical slot or a logical slot as follows. The PSFCH-PRS resource allocation period may be defined based on a slot (or logical slot) in a frame (or logical frame). Specifically, the period of a slot (or logical slot) including the PSFCH may be configured to be a factor or submultiple of a frame (or logical frame), and the transmission period through the PSFCH may be configured to be an integer multiple of N and, at the same time, a factor of a frame (or logical frame). For example, when the period of a slot (or logical slot) including the PSFCH is N=1, 2, 4, a configurable candidate PRS transmission period P for each slot period may be configured to be P=1, 2, 4 when N is 1, P=2, 4 when N is 2, and P=4 when N is 4.

PRS code division multiplexing (CDM) on/off may indicate whether CDM, which is a resource allocation method to which a code is applied, is applied.

PSFCH-PRS multiplexing number indicates the maximum number of PRSs that may be multiplexed in one symbol.

PSFCH-PRS resource size indicates the number of REs or physical resource blocks (PRBs) allocated to the PSFCH-PRS resource or the PSFCH-PRS resource region.

PSFCH-PRS starting RE or RB indicates a position at which the PSFCH-PRS resource starts in the PSFCH. Specifically, for signaling frequency resources of actual PSFCH-PRS transmission, one of RBs indicated by a bitmap in a resource pool may be selected (or, for signaling frequency resources of actual PSFCH-PRS transmission, down-select one of the following: Bitmap indicates RBs in a resource pool).

PRS frequency hopping (or PRS cyclic-shifting) on/off indicates whether PRS frequency hopping (or PRS cyclic-shifting) operation is applied.

PRS repetition on/off indicates whether a PRS repetitive transmission operation is applied. Alternatively, when the PRS is not cyclically shifted in the PRS frequency hopping operation, this may be regarded as PRS repetition (e.g., when PRS cyclic-shifting is off, this may indicate that PRS repetition is on).

The number of logical slots associated with PRS repetition or PRS frequency hopping indicates the number of slots (or logical slots) involved in PRS repetition and PRS hopping.

A PRS mode indicator is an indicator indicating whether a PRS transmitted through the PSFCH according to an SL positioning operation method is a request PRS (or a PRS requesting transmission of the PRS, i.e., Tx-PRS) or a response PRS (or a PRS transmitted in response to the PRS, i.e., an Rx-PRS). For example, when the PRS mode indicator is 0, this may indicate that the PRS is the request PRS (or request PRS mode or Tx-PRS mode) and, when the PRS mode indicator is 1, this may indicate the response PRS (response PRS mode or Rx-PRS mode) transmitted according to the response PRS mode. Alternatively, when signaling of the PRS mode indicator does not exist, the PRS mode indicator may be considered to be set to 0 by default.

A request PRS-response PRS time gap G indicates time consumed until a UE receiving the request PRS transmits the response PRS, based on a logical slot or a physical slot, after receiving the request PRS (e.g., G=2, 3, or 2 or 3 slots).

PRS resource (frequency/time/code) allocation may be related to a request PRS ID and a response PRS ID. Here, the request PRS ID indicates a pattern ID for a request PRS pattern. In this case, the pattern or pattern ID may be preconfigured in consideration of a frequency offset of a PRS starting RE (or a PRS starting RB), a base sequence, and a cyclic shift. In addition, the response PRS ID indicates a pattern or pattern ID related to the response PRS, and the pattern or pattern ID may be preconfigured in consideration of the frequency offset of the PRS starting RE (or PRS starting RB), the base sequence, and the cyclic shift.

Positioning priority may be predefined and configured by a confidence level or a positioning quality indicator (PQI). Here, the confidence level or the PQI may be defined in ascending or descending order according to the magnitude of an error. For example, a confidence level of 0 may be defined as the case in which a positioning error (PE) is greater than x cm.

Next, a PSFCH-feedback/PSFCH-PRS resource allocation method and a multiplexing method between the PSFCH-feedback resource and the PSFCH-PRS resource, for efficiently using a PSFCH resource for NR-V2X feedback information and PRS transmission, will be described. In addition, a method of allocating only the PSFCH-PRS resources without allocating the PSFCH-feedback resource in order to maximize SL positioning performance and PRS transmission efficiency will also be described. The characteristics of PSFCH-feedback resource allocation related to Release-16 are as follows.

PSFCH resource allocation may be defined within one (single) symbol (or OFDM symbol), and PSFCH-feedback information transmission may be based on a sequence-based PSFCH format of an m-PRB size. Here, PSFCH-feedback frequency resource allocation within one symbol may be performed by signaling a PRB in which the PSFCH-feedback resource is located through a bitmap.

Figure 11:
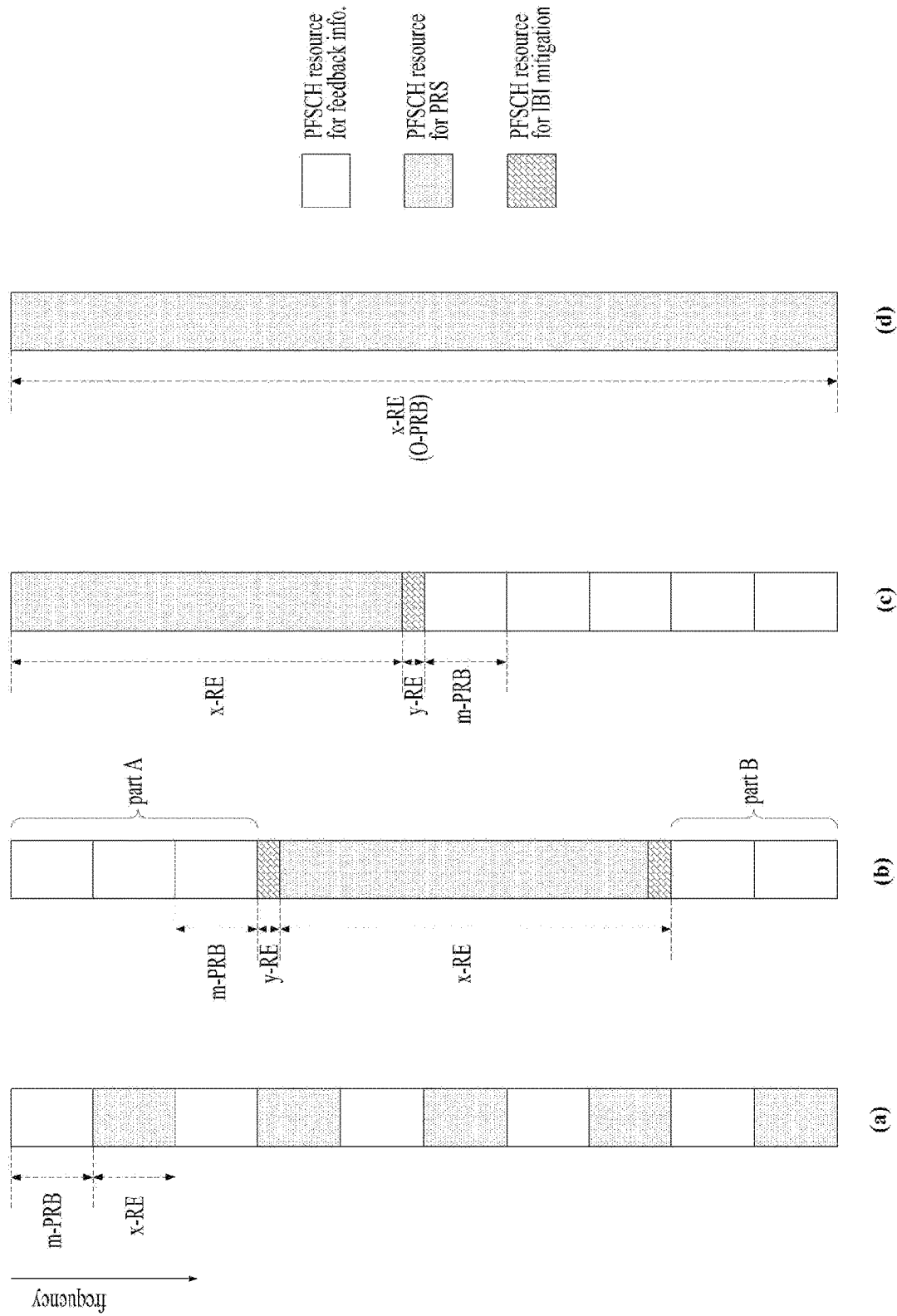
FIGS. 11 and 12 are diagrams illustrating a multiplexing type between a PSFCH-feedback and a PSFCH-PRS.
Figure 12:
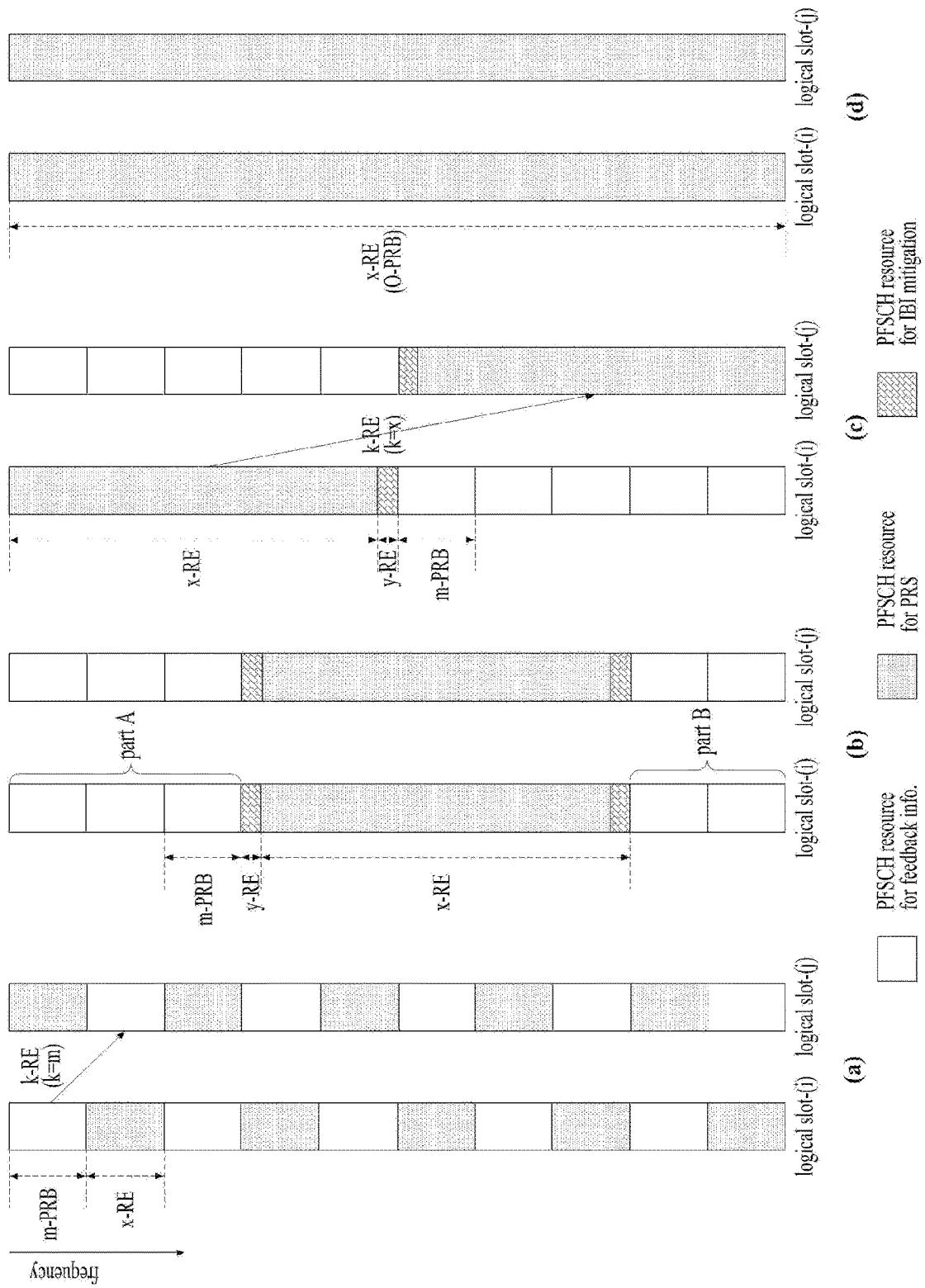

FIGS. 11 and 12 are diagrams illustrating a multiplexing type between PSFCH-feedback information and a PSFCH-PRS.

A PSFCH-feedback/PSFCH-PRS resource allocation and multiplexing type may be divided into (a) comb type, (b) burst-type-1, (c) burst-type-2, and (d) No-multiplexing. In FIG. 11, an m-PRB may mean a PRB group consisting of m (0≤m≤L1) consecutive PRBs, x-RE may mean an RE group consisting of x (0≤x≤L2) consecutive REs, and y-RE may mean an RE group consisting of y (0≤y≤L3) consecutive REs.

Referring to FIG. 11(a), the comb type may be defined as a form or a multiplexing type in which the PSFCH-feedback frequency resource and the PSFCH-PRS frequency resource are alternately disposed on the frequency axis. A detailed resource allocation method between the PSFCH-feedback frequency resource (or PSFCH-feedback frequency resource region) and the PSFCH-PRS frequency resource (or PSFCH-PRS frequency resource region) is as follows.

In relation to allocation of the PSFCH-feedback frequency resource, in 1-bit PSFCH-feedback information transmission, a 1-PRB frequency resource may be allocated as the PSFCH-feedback frequency resource and, in X-bit PSFCH-feedback information transmission, an m-PRB frequency resource may be allocated as the PSFCH-feedback frequency resource. Here, "m" may be predefined and (pre-)configured. As illustrated in FIG. 11(a), the PSFCH-feedback frequency resource may be allocated to a plurality of m-PRBs uniformly distributed at an interval of an x-RE.

For a detailed description of the x-RE, refer to PSFCH-PRS frequency resource allocation.

In relation to the PSFCH-PRS frequency resource allocation, the PSFCH-PRS may be transmitted using a plurality of x-REs. Here, "x" may be predefined and configured. The size of the x-RE may be an integer multiple of a 1-PRB size or an integer multiple of an m-PRB size (or the size of the x-RE may not be an integer multiple of the 1-PRB size or may not be an integer multiple of the m-PRB size). PSFCH-PRS frequency resource allocation within one symbol may be performed by signaling an RE group in which the PSFCH-PRS resource is located through a bitmap. As illustrated in FIG. 11(a), at least one x-RE may be uniformly distributed at an interval of the m-PRS.

The PSFCH-feedback resource of the m-PRB size and the PSFCH-PRS resource of the x-RE size may be alternately disposed and multiplexed. In other words, the PSFCH-feedback resource or the PSFCH-feedback resource region may be separately allocated at an interval of the x-RE, and the PSFCH-PRS resource or the PSFCH-PRS resource region may be separately allocated at an interval of the m-PRB.

Referring to FIG. 11(b), each of the PSFCH-feedback frequency resource and the PSFCH-PRS frequency resource is contiguously disposed on the frequency axis. Such a multiplexing type may be defined as a first burst type (burst-type-1). Burst-type-1 may provide continuous PRSs as compared to the comb type when only one symbol is used for distance measurement between UEs (or between a UE and a BS). In this case, burst-type-1 may provide SL positioning with better performance than the comb type.

In relation to burst-type-1, the PSFCH-feedback may be contiguously disposed or allocated in a PRB group in part A and part B at both ends of a symbol on the frequency axis as illustrated in FIG. 11(b). Here, the number of m-PRBs constituting part A may be equal to or different from the number of m-PRBs constituting part B.

In relation to burst-type-1, the PSFCH-PRS may be contiguously or consecutively disposed or allocated in the middle of a symbol (or, frequency resources between part A and part B) on the frequency axis. Here, the PSFCH-PRS frequency resource may consist of an x-RE, and the size of the x-RE may be an integer multiple of a 1-PRB size or an integer multiple of an m-PRB size (or the size of the x-RE size may not be an integer multiple of the 1-PRB size or may not be an integer multiple of the m-PRB size). Meanwhile, in the comb type, the frequency magnitude of the x-RE may be determined to correspond to the frequency magnitude of the m-PRB. In burst-type-1, the frequency magnitude of the x-RE may be determined to be a specific integer multiple of the m-PRB size, and the specific integer multiple may correspond to a value obtained by dividing the size of the remaining PSFCH resource region excluding the PSFCH-feedback resource region by the m-PRB.

Specifically, the PSFCH-PRS frequency resource may be allocated through signaling of information about an RE location at which the PSFCH-PRS resource starts within one symbol and about the size of the x-RE. Meanwhile, a y-RE (or, guard RE) may be additionally allocated or included at both ends of the PSFCH-PRS frequency resource. In this case, an inter-block interference (IBI) that may occur between the PSFCH-feedback frequency resource and the PSFCH-PRS frequency resource that are adjacent to each other may be minimized Here, "y" may be predefined and configured in the range of (0≤y≤N) or may be configured through SCI. When y=0, the guard RE for minimizing IBI is not inserted.

As described above, the PSFCH-feedback may be disposed or allocated on continuous frequency resources at part A and part B of both ends of a symbol on the frequency axis, and the PSFCH-PRS may be disposed or allocated on continuous frequency resources in the middle of the symbol on the frequency axis.

Referring to FIG. 11(c), each of the PSFCH-feedback frequency resource and the PSFCH-PRS frequency resource may be contiguously disposed on the frequency axis. Such a multiplexing type may be defined as a second burst type (burst-type-2).

In relation to burst-type-2, PSFCH-feedback may be disposed or allocated on continuous frequency resources at one end of a symbol on the frequency axis.

In relation to burst-type-2, the PSFCH-PRS may be disposed or allocated on continuous frequency resources at one end of a symbol corresponding to the PSFCH-feedback frequency resource on the frequency axis. Here, the PSFCH-PRS frequency resource may consist of an x-RE, and the size of the x-RE may be an integer multiple of a 1-PRB size or an integer multiple of an m-PRB size (or may not be an integer multiple of the 1-PRB size or may not be an integer multiple of the m-PRB size). Meanwhile, in the comb type, the frequency magnitude of the x-RE may be determined to correspond to the frequency magnitude of the m-PRB. In burst-type-1, the frequency magnitude of the x-RE may be determined to be a specific integer multiple of the m-PRB size, and the specific integer multiple may correspond to a value obtained by dividing the size of the remaining PSFCH resource region excluding the PSFCH-feedback resource region by the m-PRB. The PSFCH-PRS frequency resource may be allocated through signaling of information about an RE location at which the PSFCH-PRS frequency resource starts within one symbol and about the size of the x-RE.

Alternatively, a y-RE (or a guard RE) may be allocated at one end of the PSFCH-PRS frequency resource in order to minimize IBI that may occur between the PSFCH-feedback frequency resource and the PSFCH-PRS frequency resource that are adjacent to each other. Here, "y" may be predefined and configured. Alternatively, when y=0, the RE for minimizing IBI is not inserted.

Each of the frequency resource for the PSFCH-feedback may be contiguously disposed at one end of a symbol on the frequency axis. In this case, the frequency resource for the PSFCH-feedback and the frequency resource for the PSFCH-PRS may be interchanged to be contiguously disposed at the other end of the symbol. In other words, when the frequency resource for the PSFCH-feedback among frequency resources included in one symbol is continuously disposed from a low frequency, the frequency resource for the PSFCH-PRS may be continuously disposed from a high frequency. In addition, when the frequency resource for the PSFCH-feedback among frequency resources included in one symbol is continuously disposed from a high frequency, the frequency resource for the PSFCH-PRS may be continuously disposed from a low frequency.

Alternatively, referring to FIG. 11(d), only the frequency resource for the PSFCH-PRS may be disposed (No-multiplexing) in one symbol for the PSFCH in order to maximize SL positioning performance and PRS transmission efficiency. Specifically, although the PSFCH exists, the frequency resource for transmitting the PSFCH-feedback information may not be allocated. That is, the number of PRBs allocated to the PSFCH-feedback resource is "0" (or 0-PRB). In this case, the PSFCH-PRS frequency resource may be composed of continuous frequency resources included in one symbol for the PSFCH. For example, when a channel state measured for the PSFCH is less than a predetermined threshold or the movement speed of the UE is greater than or equal to a threshold, only the frequency resource for the PSFCH-PRS may be allocated without allocating the frequency resource for transmitting the PSFCH-feedback information in order to improve the performance of the PRS. Here, the PSFCH-PRS frequency resource may consist of an x-RE, and the size of the x-RE may be an integer multiple of a 1-PRB size or an integer multiple of an m-PRB size (or the size of the x-RE may not be an integer multiple of the 1-PRB size or may not be an integer multiple of the m-PRB size).

Allocation information for the frequency resource for the PSFCH-PRS within one symbol may be signaled through information about an RE location at which the frequency resource of the PSFCH-PRS starts and about the size of the x-RE. In this case, since only the PSFCH-PRS frequency resource is allocated, there is No-multiplexing between the PSFCH-PRS frequency resource and the PSFCH-feedback frequency resource.

Next, referring to FIG. 12, the PSFCH-PRS may be frequency-hopped (cyclic-shifted) or repeated in every slot (or logical slot). Specifically, the PSFCH-PRS may be frequency-hopped (cyclic-shifted) or repeated in every slot (or logical slot) for each of four types: (a) comb type, (b) burst-type-1, (c) burst-type-2, and (d) No-multiplexing. In this case, PRS transmission using PRS frequency hopping between different slots (or logical slots) may close the distance between PRSs without loss of signal-to-noise ratio (SNR) upon measuring the distance between the UEs (or between the UE and the BS), thereby improving SL positioning performance. Alternatively, PRS transmission using PRS repetition may provide SNR gain upon measuring the distance between UEs, thereby improving SL positioning performance. Furthermore, the number of PRSs multiplexed in one frequency resource for the PSFCH-PRS may be greater than or equal to a logical number related to PRS frequency hopping.

The following description is given of specific PRS frequency hopping and/or PRS repetition in consideration of four resource allocation types (multiplexing types between the PSFCH-PRS and the PSFCH-feedback) for the PSFCH.

Different slots (logical slots) may or may not be adjacent to each other in the logical domain according to a PSFCH occurrence period as illustrated in FIG. 12. A k-PRB may be defined as an RE group consisting of k (0≤k≤L4) consecutive REs.

Referring to FIG. 12(a), a PSFCH-PRS transmitted in a PSFCH-PRS resource region, allocated as comb type (see FIG. 11(a)), may be frequency-hopped and/or repeatedly transmitted based on a preconfigured PRS frequency hopping/repetition pattern in units of slots. Alternatively, the PSFCH-PRS resource region may be allocated by applying frequency hopping in units of slots based on the preconfigured PRS frequency hopping/repetition pattern.

Here, the number N of slots (logical slots) related to PRS frequency hopping/repetition (or participating in frequency hopping) may be determined by the UE/BS/location management function (LMF), etc. or predefined and configured. In addition, information on the number of slots may be transmitted between UEs through 2-stage SCI. Alternatively, PRS frequency hopping (or frequency hopping for the PSFCH-PRS) may be performed through an operation of cyclically shifting the PRS by a k-RE on the frequency axis. In this case, "k" may be predefined and configured or may be configured through SCI. Information about k may be transmitted between UEs through the 2-stage SCI.

For example, the number N of slots (or logical slots) related to frequency hopping may be set to 2 and the PSFCH-PRS may be frequency-hopped by an m-RE, as illustrated in FIG. 12(a).

Here, the PRSs transmitted through different slots (or logical slots) related to PRS frequency hopping may have different PRS sequences or patterns. Alternatively, when k is 0, the PSFCH-PRS may be repeatedly transmitted without applying frequency hopping, and PSFCH-PRSs transmitted in different slots may have the same or different PRS sequences (or PRS patterns).

In this way, when the PSFCH-PRS is frequency-hopped/repeatedly transmitted, a reception (Rx) UE may perform TOA positioning by combining the PSFCH-PRSs transmitted in the at least one slot. Specifically, the Rx UE may make the distance between the combined PRSs closer by combining all PRSs received from at least one slot (or logical slot) related to PRS frequency hopping. Thus, the Rx UE may improve TOA accuracy and performance through the combined PRSs. For example, as illustrated in FIG. 12(a), when the Rx UE combines all PRSs received from at least one slot (or logical slot) related to PRS frequency hopping, the combined PRSs may have the effect of receiving one continuous PRS (or PRSs in a continuous resource region) such as the PSFCH-PRS frequency resource of No-multiplexing type of FIG. 11(d).

Alternatively, the Rx UE may adjust the number of slots or the number of PRSs combined for TOA measurement based on movement speed. For example, the number K of PRSs that may be combined according to the movement speed of the UE may be predefined, and K may be set to be equal to or smaller than N.

Alternatively, the Rx UE may adjust the number of PRSs combined for TOA measurement based on a measured channel state. For example, the number K of PRSs that may be combined may be predefined according to the degree of time selectivity and frequency selectivity of a channel.

Referring to FIG. 12(b), a PSFCH-PRS transmitted in a PSFCH-PRS resource region allocated as burst-type-1 (see FIG. 11(b)) may be frequency-hopped and/or repeatedly transmitted based on a preconfigured PRS frequency hopping/repetition pattern in units of slots. Alternatively, the PSFCH-PRS resource region may be allocated by applying frequency hopping in units of slots based on the preconfigured PRS frequency hopping/repetition pattern.

In other words, in burst-type-1 based on PSFCH resource allocation and multiplexing described in FIG. 11(b), PRS frequency hopping and/or PRS repetition between different slots (or logical slots) may be applied.

Here, the number N of slots (logical slots) related to PRS frequency hopping/repetition (or participating in frequency hopping) may be determined by the UE/BS/LMF or may be predefined and configured. In addition, information about the number may be transmitted between UEs through the 2-stage SCI. Alternatively, PRS frequency hopping (or frequency hopping for the PSFCH-PRS) may be performed through an operation of cyclically shifting the PRS by a k-RE on the frequency axis. In this case, "k" may be predefined and configured or may be configured through the SCI. Information about k may be transmitted between UEs through the 2-stage SCI.

Alternatively, a PRS cyclic shift operation on the frequency axis may not be performed (k=0) in part A and part B in which the frequency resource for the PSFCH-feedback is contiguously disposed. Even when the PRS cyclic shift operation is performed, the operation may be performed only within part A and part B.

Alternatively, in a region in which the frequency resource for the PSFCH-PRS is contiguously disposed, the PRS cyclic shift operation for the PSFCH-PRS may or may not be performed. A description of an embodiment is given below. When one PRS is transmitted fully using the PSFCH-PRS frequency resource, the PRS frequency hopping operation may not be performed. Alternatively, when a plurality of PRSs multiplexed through CDM is transmitted fully using the PSFCH-PRS frequency resource, the PRS frequency hopping operation is not performed.

Alternatively, when a plurality of PRSs is multiplexed and transmitted on different PSFCH-PRS frequency resources (or different PSFCH-PRS frequency resource regions), the PRS frequency hopping operation may be performed. PRS frequency hopping may be performed through an operation of cyclically shifting the PRS by a k-RE on the frequency axis, and "k" may be predefined and configured or may be configured through the SCI. Here, the frequency-hopped PRS may have a different PRS sequence or pattern in each slot (or logical slot).

Alternatively, PSFCH resource allocation through PRS repetition corresponds to the case in which k=0 in FIG. 12(b) (or PRS is cyclically shifted by a 0-RE). In this case, PRSs transmitted through different slots (or logical slots) may have identical or different PRS sequences or patterns.

Referring to FIG. 12(c), a PSFCH-PRS transmitted in a PSFCH-PRS resource region allocated as burst-type-2 (see FIG. 11(c)) may be frequency-hopped and/or repeatedly transmitted based on a preconfigured PRS frequency hopping/repetition pattern in units of slots. Alternatively, the PSFCH-PRS resource region may be allocated by applying frequency hopping in units of slots based on the preconfigured PRS frequency hopping/repetition pattern.

In other words, the PSFCH-PRS (or PRS) based on PSFCH resource allocation and multiplexing of burst-type-2 described in FIG. 11(c) may be transmitted by applying PRS frequency hopping and/or PRS repetition in different slots (or logical slots).

Here, a k-RE may correspond to the size of REs by which the PRS is cyclically shifted for frequency hopping on the frequency axis. The frequency-hopped PRS may have a different PRS sequence or pattern in each slot. In this case, when PRSs received from slots (or logical slots) related to PRS frequency hopping are combined, the distance between the PRSs may become close and thus positioning performance may be improved. That is, when the Rx UE combines PRSs to which frequency hopping is applied, the Rx UE may obtain an effect of receiving one continuous PRS such as the PSFCH-PRS frequency resource through No-multiplexing of FIG. 11(d).

Alternatively, PSFCH resource allocation through PRS repetition corresponds to the case in which k=0 in FIG. 12(c) (or PRS cyclic shift by a 0-RE). In this case, PRSs transmitted in different slots (or logical slots) may have identical or different PRS sequences or patterns.

Referring to FIG. 12(d), PRS frequency hopping and PRS repetition between different slots (logical slots) may be applied based on PSFCH resource allocation and multiplexing of No-multiplexing described in FIG. 11(d). In other words, the PSFCH-PRS (or PRS) based on PSFCH resource allocation and multiplexing of No-multiplexing described in FIG. 11(d) may be transmitted by applying PRS frequency hopping and PRS repetition in different slots (or logical slots). Here, the number of logical slots related to PRS frequency hopping is 2 (N=2), and PRS frequency hopping may be performed through an operation of cyclically shifting the PRS by a k-RE on the frequency axis.

Alternatively, when one PRS is transmitted using all of the PSFCH-PRS frequency resource, the PRS frequency hopping operation may not be performed. Alternatively, when a plurality of PRSs multiplexed through CDM is transmitted fully using the PSFCH-PRS frequency resource, the PRS frequency hopping operation may not be performed.

Alternatively, when a plurality of PRSs is multiplexed on different PSFCH-PRS frequency resources and transmitted, the PRS frequency hopping operation may be performed.

Alternatively, if k=0 (or PRS is cyclically shifted by a 0-RE), the PSFCH-PRS may be repeatedly transmitted without application of frequency hopping (or PSFCH resource allocation may be performed through PRS repetition). In this case, PRSs transmitted through different slots may have identical or different PRS sequences or patterns.

As such, the UE may determine a frequency hopping or repetition scheme of the PSFCH-PRS according to a multiplexing type. The frequency hopping or repetition scheme may be differently determined according to each type.

Figure 13:
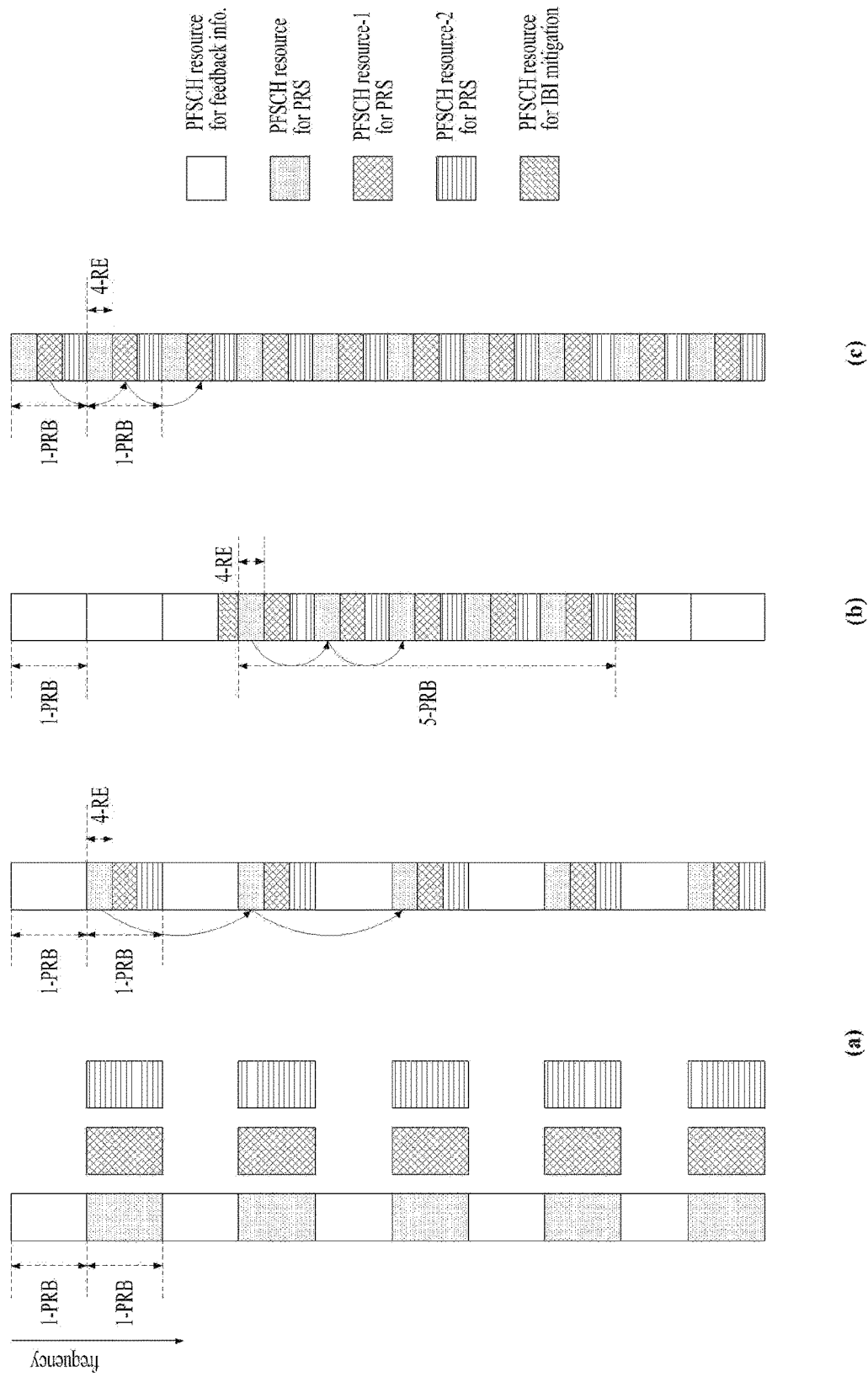
FIG. 13 is a diagram illustrating a method of multiplexing a plurality of PRSs in a PSFCH-PRS frequency resource region.

FIG. 13 is a diagram illustrating a method of multiplexing a plurality of PRSs in a PSFCH-PRS frequency resource region.

Referring to FIG. 13, a plurality of PRSs may be multiplexed in one PSFCH-PRS frequency resource region. That is, a plurality of PRSs using one PSFCH-PRS frequency resource may be multiplexed with respect to three types (a) comb type, (b) burst-type-1, and (d) No-multiplexing, described in FIG. 11. In this case, PRS frequency hopping and PRS repetition may not be applied.

In this case, the following conditions may be assumed; 1) Three different PRSs are multiplexed, 2) The PSFCH-feedback frequency resource region consists of a plurality of 1-PRBs, and 3) The PSFCH-PRS frequency resource region consists of a plurality of 4-REs. Hereinafter, a method of multiplexing a plurality of PRSs using PSFCH-PRS frequency resources with respect to three PSFCH resource allocation types will be described.

Referring to FIG. 13(a), a plurality of PRSs may be multiplexed using the PSFCH-PRS frequency resource region of comb type (refer to FIG. 11(a)). As illustrated in FIG. 13(a)-1, a plurality of PRSs may be multiplexed through CDM in each PSFCH-PRS frequency resource region. In this case, each PRS may fully use the allocated PSFCH-PRS frequency resource region. As illustrated in FIG. 13(a)-2, plural PRSs may be multiplexed on respective orthogonal frequency resources included in each PSFCH-PRS frequency resource region, and each PRS may distributively use one allocated PSFCH-PRS frequency resource region. In other words, the plural PRSs may be distributed to the respective frequency resources included in one PSFCH-PRS resource region and then multiplexed.

Referring to FIG. 13(b), a plurality of PRSs may be multiplexed using the PSFCH-PRS frequency resource region of the first burst type (refer to FIG. 11(b)). As illustrated in FIG. 13(b), plural PRSs may be multiplexed on respective orthogonal frequency resources included in the PSFCH-PRS frequency resource region (or multiplexed using the orthogonal PSFCH-PRS frequency resources). In this case, each PRS may distributive use the allocated PSFCH-PRS frequency resources. In other words, the plural PRSs may be distributed to the respective frequency resources included in one PSFCH-PRS resource region and then multiplexed. Alternatively, similar to FIG. 13(a)-1, the plural PRSs are multiplexed through CDM, and each PRS may fully use the PSFCH-PRS frequency resource region.

Referring to FIG. 13(c), a plurality of PRSs may be multiplexed using the PSFCH-PRS frequency resource region of No-multiplexing (refer to FIG. 11(c)). As illustrated in FIG. 13(c), plural PRSs may be multiplexed on respective orthogonal frequency resources included in the PSFCH-PRS frequency resource region (or multiplexed using the orthogonal PSFCH-PRS frequency resources). In this case, each PRS may distributive use the allocated PSFCH-PRS frequency resources. In other words, the plural PRSs may be distributed to the respective frequency resources included in one PSFCH-PRS resource region and then multiplexed. Alternatively, similar to FIG. 13(a)-1, the plural PRSs are multiplexed through CDM. In this case, each PRS may fully use the PSFCH-PRS frequency resource region.

Figure 14:
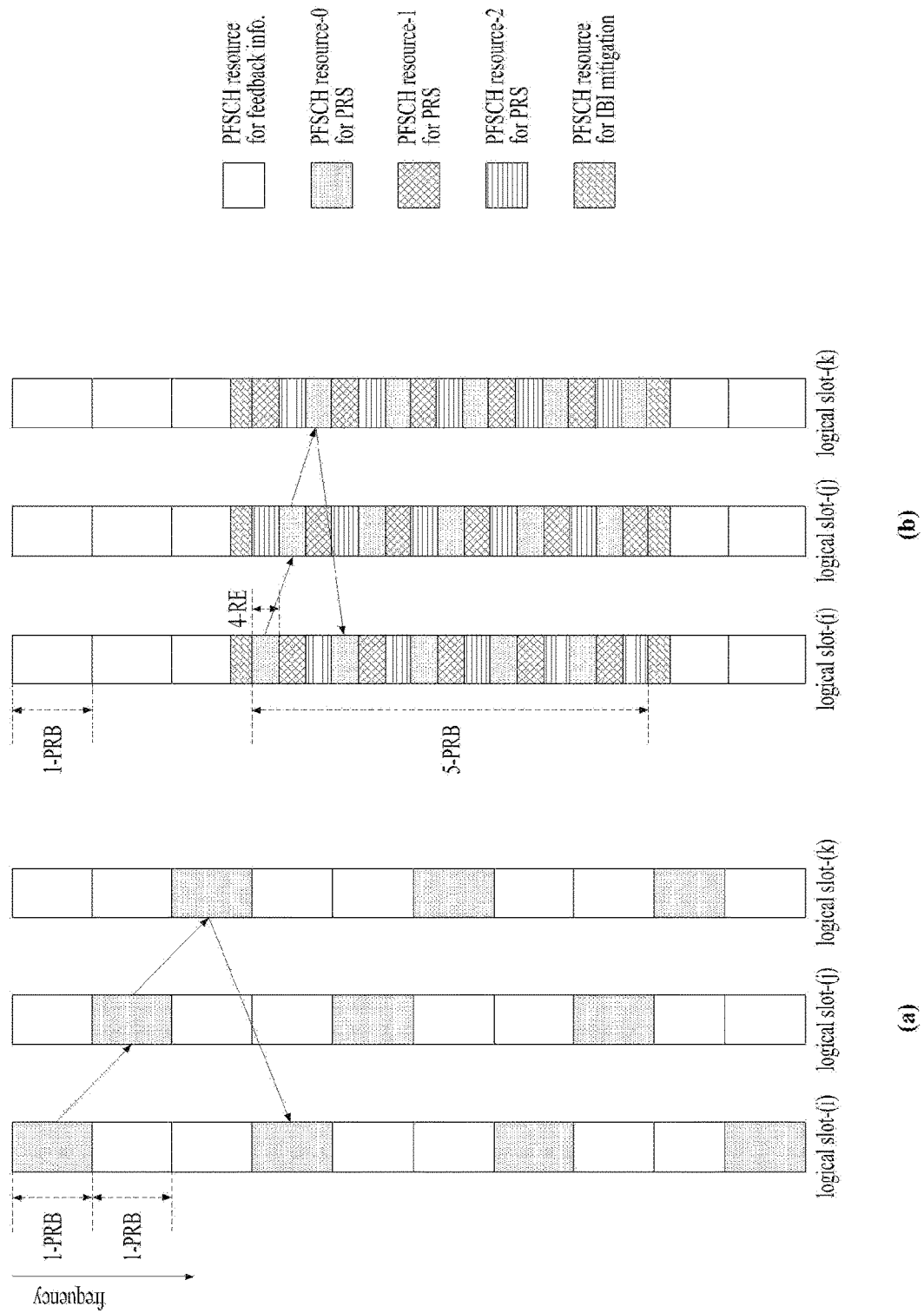
FIGS. 14 and 15 are diagrams illustrating a method of frequency-hopping or repeatedly transmitting a plurality of multiplexed PRSs in one PSFCH-PRS frequency resource region.
Figure 15:
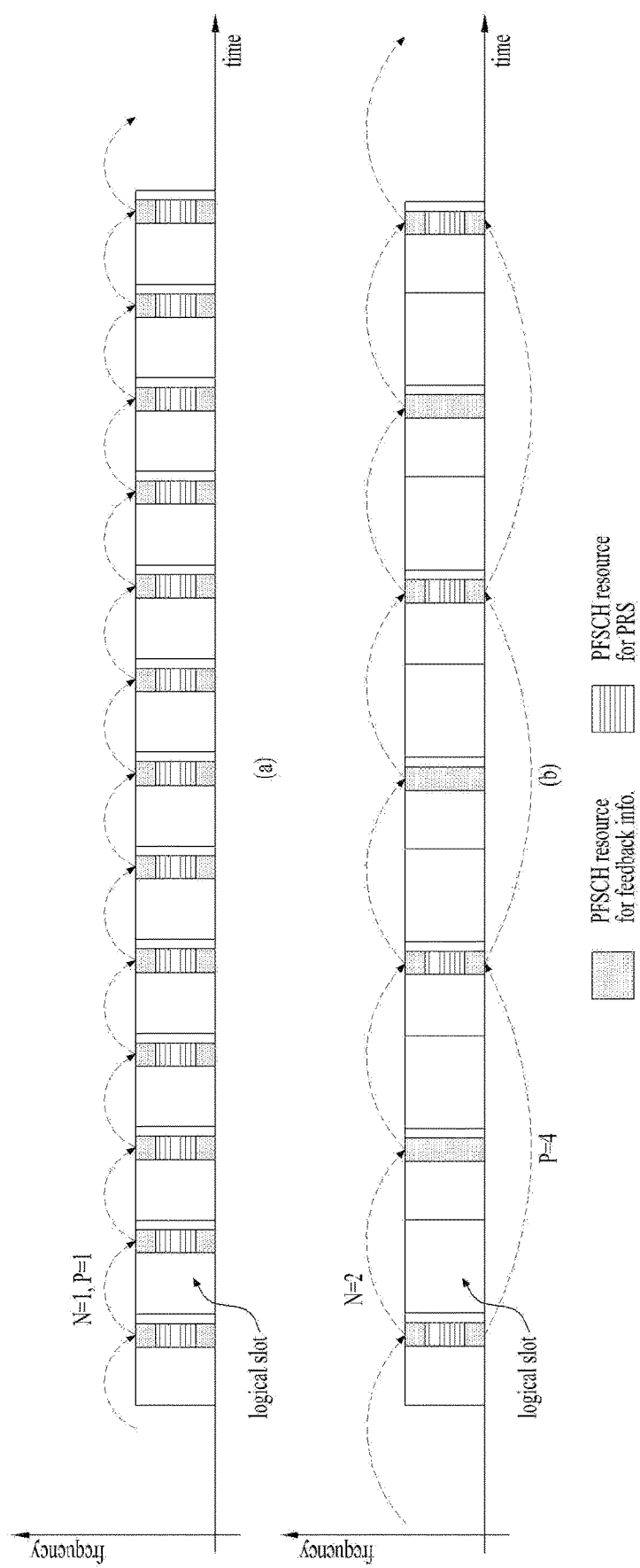

FIGS. 14 and 15 are diagrams illustrating a method of frequency-hopping or repeatedly transmitting a plurality of multiplexed PRSs in one PSFCH-PRS frequency resource region.

Referring to FIG. 14, a plurality of PRSs may be multiplexed in each of at least one PSFCH-PRS frequency resource region according to two types of (a) comb type and (b) burst-type-1, and frequency hopping and repetition may be applied to the plural PRSs with respect to each slot.

In this case, it may be assumed that 1) three different PRSs are multiplexed, 2) the number of logical slots related to PRS frequency hopping and PRS repetition is three, 3) a PSFCH-feedback frequency resource consists of a plurality of 1-PRBs, and 4) a PSFCH-PRS frequency resource consists of a plurality of 4-REs. A description of a method of multiplexing a plurality of PRSs using a PSFCH-PRS frequency resource with respect to two types of PSFCH resource allocation is given below.

Referring to FIG. 14(a), a plurality of PRSs may be multiplexed using the PSFCH-PRS frequency resource region of the comb type (see FIG. 13(a)) and PRS frequency hopping and repetition may be applied to the PRBs. A PSFCH-PRS frequency resource region consisting of a plurality of 1-PRBs has the size of a 2-PRB PSFCH-feedback frequency resource and is uniformly distributed. PRS frequency hopping may be performed by cyclically shifting the PRS by a 1-PRS on the frequency axis. In this case, a plurality of PRSs may be multiplexed in the PSFCH-PRS frequency resource region as described with reference to FIG. 13(a).

Through such frequency hopping and PRS repetition, the Rx UE may obtain an effect of receiving a plurality of PRSs in the PSFCH-PRS frequency resource region through No-multiplexing of FIG. 11(d) by combining PRSs received through at least one slot.

PSFCH-PRS resource allocation through PRS repetition may correspond to the case in which a PRS is cyclically shifted by a 0-RE.

Referring to FIG. 14(b), a plurality of PRSs multiplexed using the PSFCH-PRS frequency resource region in the first burst type (see FIG. 13(b)) may be frequency-hopped and repeatedly transmitted. The PSFCH-PRS frequency resource region consisting of a plurality of 5-PRBs is uniformly distributed for transmission of three different PRSs, and PRS frequency hopping may be performed by cyclically shifting the PRS by a 4-RE on the frequency axis. In this case, the number of PRSs multiplexed in one PSFCH-PRS frequency resource region may be greater than or equal to the number of logical slots related to PRS frequency hopping.

Through such frequency hopping and PRS repetition, the Rx UE may obtain an effect of receiving a plurality of PRSs in the PSFCH-PRS frequency resource region through No-multiplexing of FIG. 11(*d*) by combining PRSs received through at least one slot. Meanwhile, PSFCH-PRS resource allocation through PRS repetition may correspond to the case in which a PRS is cyclically shifted by a 0-RE.

The PSFCH-PRS resource region (or PSFCH-PRS resource) may be allocated at a preconfigured period P based on a slot (logical slot). Referring to FIG. 15, when a PSFCH allocation period is N=1 and N=2, the PSFCH-PRS resource region may be multiplexed with a PSFCH-feedback resource at a period P (1 and/or 4). Additionally, only the PSFCH-PRS resource may be allocated at the period P (1 and/or 4) without PSFCH-feedback resource allocation.

Resource Allocation for PSFCH-Based On-Demand SL Positioning

Herein below, a method of reserving a resource for transmitting sidelink positioning control information (SPCI) required to perform on-demand positioning through a PSFCH between UEs and between a UE and a road side unit (RSU) and a PSFCH-PRS resource for transmitting a PRS will be described. In particular, a method of reserving a resource necessary for performing positioning based on a resource reservation process for conventional V2X data communication is proposed. That is, a resource reservation process for performing positioning is not independently requested and performed and may be requested and performed only when the resource reservation process for V2X data communication is performed. This resource reservation operation method may improve the efficiency of the entire V2X frequency resource and time resource use. The terms used in the following description are described below.

Data includes message information, audio/video information, sensor information, and location information.

A resource for positioning may include a resource for SPCI transmission and a PSFCH-PRS resource for PRS transmission as follows. Specifically, the SPCI may be transmitted through an SIB, 1st-stage SCI, and/or 2nd-stage SCI, and the resource for SPCI transmission includes a PSBCH, a PSCCH, and/or a PSSCH. In this case, the SPCI may mainly include PSFCH configuration information for PRS transmission, various measurement information related to positioning, and resource reservation information for PRS transmission. The PSFCH-PRS resource for PRS transmission may include resources in the time domain, the frequency domain, and/or the CDM domain.

On-demand positioning includes absolute positioning and relative positioning.

An upper layer includes an application layer and a facilities layer.

In on-demand positioning, a PRS includes a request PRS (Tx-PRS) and a response PRS (Rx-PRS).

As a method of reserving a resource for V2X data communication and simultaneously reserving a resource required for positioning, 1) dynamic positioning resource reservation and 2) static positioning resource reservation are described below.

1) Dynamic Positioning Resource Reservation Method

Dynamic positioning resource reservation is performed when there is a resource reservation request for positioning together with a positioning request by an upper layer and is not performed if there is no resource reservation request for positioning by the upper layer. This dynamic positioning resource reservation increases the efficiency of use of limited time/frequency resources when the number of UEs performing positioning is large or when one UE participates in one or more positioning operations at the same time. In contrast, since this dynamic positioning resource reservation is performed only when there is a resource request for V2X data communication by the upper layer, even if the need for positioning occurs, resource reservation for positioning is not requested and a delay may occur in positioning when i) there is no resource reservation request for V2X data communication or ii) resource reservation for V2X data communication has already been completed.

Alternatively, the UE may perform reservation for a dynamic positioning resource using a Uu interface. When the UE is in network coverage, allocation and reservation of a resource for V2X data communication and a resource for positioning may be performed by the location server/LMF and/or BS and then transmitted to the UE through the Uu interface. A description of a main operation performed between the UE and the BS for dynamic positioning resource reservation using the Uu interface is given below.

Specifically, the UE makes a request to the BS for resource allocation and reservation for V2X data communication and positioning through a scheduling request (SR) and reports the amount of V2X data stored in a buffer and the amount of data required for the type of positioning to be performed through a buffer state report (BSR). In this case, the BSR may be performed by distinguishing between the resource for V2X data communication and the resource for positioning or may be performed by reporting the total amount of resources required without distinction. In addition, the SR may include information such as the type of positioning to be performed by the UE and a latency budget.

The BS determines an appropriate MCS needed to transmit a PSCCH and a PSSCH using SR/BSR information received from the UE and informs the UE of a transport format including the MCS through a PDCCH (downlink grant). In this case, the PSCCH and the PSSCH include a 1st-stage SCI resource and a 2nd-stage SCI resource for SPCI transmission. In addition, the BS informs the UE of periodic or aperiodic resource reservation and related configuration information for V2X data transmission and periodic or aperiodic PSFCH-PRS resource reservation and configuration information for PRS transmission required for positioning, through the PDCCH and/or the PDSCH. In this case, a PSFCH-PRS transmission resource may include information such as a time resource of a PSFCH through which a PRS is transmitted, a frequency resource of the PSFCH, and a PRS pattern.

When the UE requests allocation and reservation of a resource for positioning along with allocation and reservation of a plurality of resources for multi-V2X data communication, the BS provides information about in which resource among the resources for multi-V2X data communication the resource for performing positioning is included or how many resources for V2X data transmission are distributed. As an embodiment, when the period of a plurality of resources for V2X data transmission and the number of transmissions of the resources are different, the BS selects the most suitable resource for performing positioning requested by the UE through the SR and informs the UE of the selected resource.

The UE may transmit, in one slot, resource reservation information for V2X data transmission, PSFCH-PRS resource reservation information for performing positioning, and a PRS. In this case, the UE may inform the BS of whether the PRS is transmitted through SCI.

Alternatively, the UE may reserve a dynamic positioning resource using sensing. When the UE is in network coverage or out of network coverage, allocation and reservation of the resource for V2X data communication and the resource for positioning may be performed through the sensing operation of the UE. A description of a main operation of the UE through sensing is given below.

If there is a request for allocation and reservation of the resource for V2X data communication and the resource for positioning by the upper layer, the UE selects and reserves available resources by analyzing SCI received (or sensed) from a neighboring UE for a predetermined time. In this case, the size of the PSCCH and PSSCH resources for transmitting the periodic or aperiodic resource reservation and related configuration information for V2X data transmission and the periodic or aperiodic PSFCH-PRS resource reservation and configuration information for PRS transmission required for positioning is selected in consideration of the amount of V2X data stored in the buffer, the type of positioning to be performed, and the amount of data required for an operation method. In this case, the UE may adjust and determine an MCS in consideration of a usage rate of all SL resources and the amount of data that the UE desires to transmit.

The UE selects and reserves the PSFCH-PRS resource for PRS transmission along with selection and reservation of the PSSCH/PSSCH resource for V2X data transmission by analyzing the SCI received from the neighboring UE. Thereafter, the resource reservation and related configuration information for V2X data transmission and the PSFCH-PRS resource reservation and configuration information are transmitted through the 1st-stage SCI and the 2nd-stage SCI.

When the upper layer requests allocation and reservation of a plurality of resources for multi-V2X data communication and allocation and reservation of a resource for positioning, the UE selects the most suitable resource for positioning. That is, when the period of a plurality of resources for V2X data transmission and the number of transmissions of the resources are different, the UE selects the most suitable resource for positioning characteristics. When necessary, the UE may indicate in which resource among a plurality of V2X data transmission resources the selected resource is included.

The UE may transmit, in one slot, resource reservation information for V2X data transmission, PSFCH-PRS resource reservation information for performing positioning, and the PRS. The UE may indicate whether the PRS is transmitted through the SCI.

2) Static Positioning Resource Reservation Method

Figure 16:
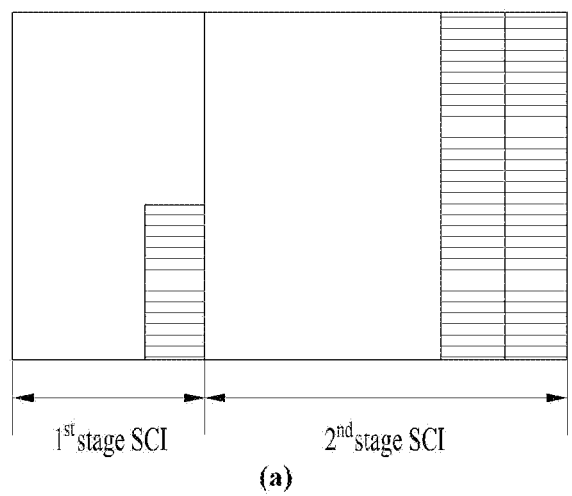
FIG. 16 is a diagram illustrating the structure of positioning resources that are previously allocated and configured.
Figure 16:
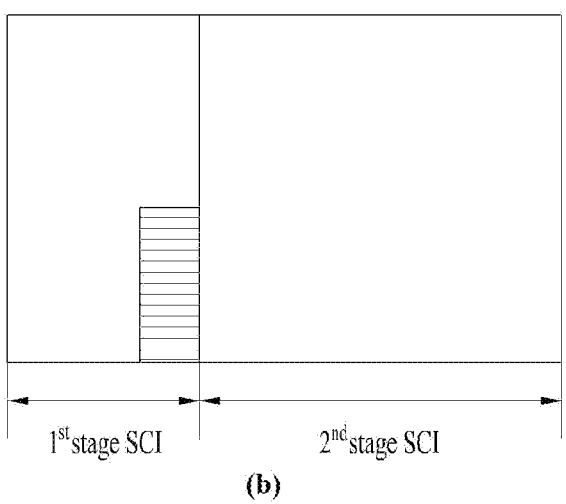
Figure 16:
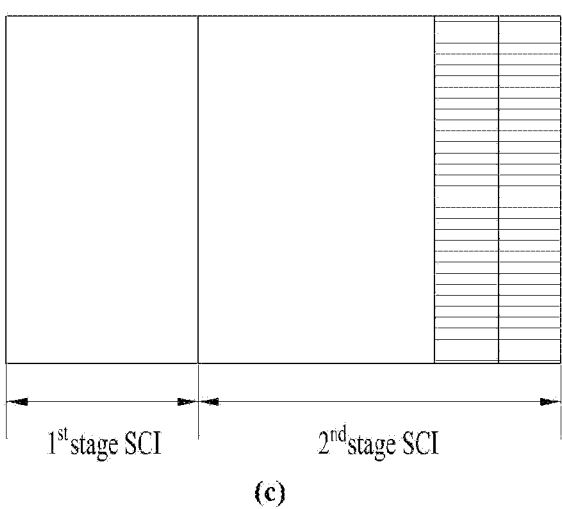

FIG. 16 is a diagram illustrating the structure of positioning resources that are previously allocated and configured.

Static positioning resource reservation is a method of simultaneously reserving a resource required for positioning while reserving a resource for V2X data communication regardless of whether reservation of the resource for positioning is requested by an upper layer. Unlike dynamic positioning resource reservation, this static positioning resource reservation method may be performed quickly when there is a request for positioning by the upper layer because the resource for positioning is previously allocated and configured. In contrast, when the number of UEs performing positioning is large or when one UE participates in one or more positioning operations at the same time, efficiency of using limited resources is reduced.

Referring to FIG. 16, a resource for positioning in a PSCCH and/or a PSSCH for SPCI transmission may be previously allocated through static positioning resource reservation. A PSFCH-PRS resource for PRS transmission may be predefined and configured, determined by the location server/LMF and/or BS, or reserved through sensing. Reservation information for the PSFCH-PRS resource may be transmitted through 1st-stage SCI of a previously allocated PSCCH and 2nd-stage SCI of a previously allocated PSSCH. For example, FIG. 16(*a*) illustrates a SPCI transmission structure using PSCCH and PSSCH resources, FIG. 16(*b*) illustrates a PSCI transmission structure using a PSCCH resource, and FIG. 16(*c*) illustrates a PSCI transmission structure using a PSSCH resource.

Whether a static positioning resource reservation method is performed and how to operate the static positioning resource reservation method are transmitted to the UE through an SIB. Specifically, when positioning is not requested by the upper layer (or when PRS transmission is not requested), the 1st-stage SCI resource and/or the 2nd-stage SCI resource previously allocated for positioning may be filled with dummies or 0s or may be emptied (or not transmitted). When positioning is requested by the upper layer (or when PRS transmission is requested), the 1st-stage SCI resource and/or the 2nd-stage SCI resource previously allocated for positioning includes PSFCH-PRS reservation information and positioning operation related information.

Alternatively, reservation for a static positioning resource may be performed through a Uu interface.

Specifically, when the UE is in network coverage, allocation and reservation of a resource for V2X data communication and a resource for positioning may be performed by the location server/LMF and/or the BS and then transmitted to the UE through the Uu interface, similarly to dynamic positioning resource reservation. A main operation performed between the UE and the BS for static positioning resource reservation using the Uu interface is as follows.

The UE may make a request to the BS for resource allocation and reservation for V2X data communication and positioning through an SR and report the amount of V2X data stored in the buffer and the amount of data required for the type of positioning to be performed through a BSR. The BS determines an appropriate MCS required for PSCCH and PSSCH transmission using SR/BSR information received from the UE and informs the UE of a transport format including the MCS through a PDCCH. When the UE requests allocation and reservation of a resource for positioning along with allocation and reservation of a plurality of resources for multi-V2X data communication, the BS may provide information about in which resource among the resources for V2X data communication the resource for performing positioning is included or how many resources for V2X data transmission are distributed.

Alternatively, the static positioning resource may be reserved using sensing. When the UE is in network coverage or out of network coverage, allocation and reservation of the resource for V2X data communication and the resource for positioning may be performed through a sensing operation of the UE, similar to dynamic positioning resource reservation. Specifically, when there is a resource allocation and reservation request for V2X data communication and positioning by the upper layer, the UE selects and reserves available resources by analyzing SCI received (or sensed) from a neighboring UE during a predetermined time. In this case, the size of the PSCCH and PSSCH resources for transmitting periodic or aperiodic resource reservation and related configuration information for V2X data transmission and periodic or aperiodic PSFCH-PRS resource reservation and configuration information for PRS transmission required for positioning is selected in consideration of the amount of V2X data stored in the buffer, the type of positioning to be performed, and the amount of data required for an operation method. In this case, the UE may adjust and determine an MCS in consideration of a usage rate of all SL resources and the amount of data that the UE desires to transmit. When there is a request for positioning by the upper layer (or PRS transmission is requested), the UE may select available PSFCH-PRS resources and a PRS ID or pattern by analyzing the SCI received from the neighboring UE and provide PSFCH-PRS reservation related information using the 1st-stage SCI and/or 2nd-stage SCI resource previously allocated to perform positioning.

A main resource reservation process and execution procedure related to positioning for various on-demand positioning scenarios will be described below.

On-Demand Positioning Scenario

If it is determined that location information update for a neighboring UE is needed because a confidence level for information about an absolute location or relative location of a neighboring UE does not satisfy a certain level, an upper layer simultaneously makes a request to a lower layer for resource reservation for performing on-demand positioning while requesting a resource for V2X data communication. In this case, the neighboring UE may include a UE performing a unicast mode operation or a groupcast mode operation therewith and include an unspecified UE that does not have a unicast/groupcast relationship therewith. When there is no location information for the UE, the upper layer may simultaneously make a request to the lower layer for resource reservation for performing related positioning while requesting a resource for V2X data communication.

Upon determining that it is necessary to update location information because a positioning tracking error for absolute or relative location information of the upper layer exceeds a threshold or the confidence level does not satisfy a certain level, the upper layer may simultaneously make a request to the lower layer for resource reservation for performing related positioning while requesting a resource for V2X data communication.

Hereinbelow, i) positioning-related information provided by the upper layer to the lower layer, ii) a positioning-related SIB, 1st-stage SPCI, and 2nd-stage SPCI, transmitted through a PSBCH, a PSCCH, and/or a PSSCH, and iii) positioning-related data information transmitted through the PSSCH will be described.

In relation to i), the positioning-related information provided by the upper layer to the lower layer may include a positioning request indicator. The upper layer may request positioning including positioning resource reservation through the positioning request indicator. For example, when the positioning request indicator is set to 0, this indicates that the upper layer does not request positioning. The 1st-stage SPCI may indicate information about the location and size of the 2nd-stage SPCI. If the positioning request indicator is set to 1, this indicates that the upper layer requests positioning.

In relation to ii), the 1st-stage SPCI and the 2nd-stage SPCI may be provided as positioning-related control information.

The 1st-stage SPCI is positioning-related control information transmitted through the PSCCH. Specifically, the 1st-stage SPCI may include an indicator indicating whether the 2nd-stage SPCI exists. For example, when the indicator related to the 1st-stage SPCI is "1", this indicates that the 2nd-stage SPCI exists and, when the indicator related to the 1st-stage SPCI is "0", this indicates that the 2nd-stage SPCI does not exist. In addition, the 1st-stage SPCI may indicate information about the location and size of the 2nd-stage SPCI in the 2nd-stage SCI.

The 2nd-stage SPCI may be positioning-related control information transmitted through the PSSCH. Specifically, the 2nd-stage SPCI may include ID related information of a UE participating in positioning, reservation information related to a PRS ID or pattern, a PRS transmission indicator, reservation information related to the period of PRS transmission and/or the number of PRS transmissions, reservation information related to a PRS transmission offset, and/or location information of each UE participating in positioning. Hereinafter, each piece of information that may be included in the 2nd-stage SPCI will be described in detail.

ID related information of a UE participating in positioning: The ID related information of the UE participating in positioning may include a positioning source ID and a positioning destination ID. When the UE participates in both unicast mode operation and groupcast mode operation, the positioning source ID may be the same as or different from a source ID, and the positioning destination ID may be the same as or different from a destination ID. Here, the positioning source ID may be an ID of a UE that requests positioning, wants to perform positioning, or transmits a request PRS. The positioning destination ID may be an ID of a UE that receives a request for positioning, participates in positioning, or transmits a response PRS.

Reservation information related to a PRS ID or pattern: A PRS may be composed of a request PRS and a response PRS. A PRS ID reservation method may be differently configured depending on a (pre)configured relationship between the request PRS and the response PRS. Specifically, when the relationship between the request PRS and the response PRS is previously mapped and configured, only one of the request PRS ID and the response PRS ID may be reserved. For example, when 1:1 positioning between a UE and a UE is considered to be performed, another UE that has received the request PRS ID transmitted by one UE may transmit, as a response, the response PRS according to a preconfigured (or promised) response PRS ID without separately selecting the response PRS ID. In contrast, when the relationship between the request PRS and the response PRS is not previously mapped and configured, reservation may be made by distinguishing between the request PRS ID and the response PRS ID.

A PRS transmission indicator: The PRS transmission indicator indicates whether a PRS is transmitted in a current slot. For example, if the PRS transmission indicator is 1, this indicates that the PRS is being transmitted in the current slot and, if the PRS transmission indicator is 0, this indicates that the PRS is not being transmitted in the current slot.

Reservation information related to the period of PRS transmission and/or the number of PRS transmissions.

Reservation information related to a PRS transmission offset: A PRS transmission timing may be the same as or different from a V2X data communication transmission timing. For example, the PRS transmission timing may be transmitted after a delay of "X=1 or 2 slots" as compared with the V2X data communication transmission timing. In this case, a delay time corresponding to the "X" slots may mean the PRS transmission offset.

Location information of each UE participating in positioning: Location information of each UE may be provided to neighboring UEs. In this case, the location information may include absolute location information and/or relative location information.

In relation to iii), the positioning-related data information transmitted through the PSSCH may include time difference information between a response PRS transmission timing and a request PRS reception timing, reference signal received power (RSRP)/AoA/Doppler measurement information, PRS multiplexing related information, and/or a Tx-Rx time difference (TRTD) information.

Time difference information Y between the response PRS transmission time and the request PRS reception time: This indicates time consumed until a UE that has received a request PRS transmitted by one UE transmits a response PRS as a response and may differ as follows depending on a pre-configuration relationship between the request PRB and the response PRS. The time difference "Y slots" between the response PRS transmission timing and the request PRS reception timing may be predefined and configured. As an embodiment, when "Y=2", the UE that has received the request PRS may transmit the response PRS after a delay of "Y=2" slots. Meanwhile, when the time difference between the response PRS transmission timing and the request PRS reception timing is not predefined, the response PRS transmission time may vary according to a response PRS reservation time.

RSRP/AoA/Doppler measurement information: A UE that has received the request PRS may provide RSRP measurement, AoA measurement, and/or Doppler measurement information to a UE that has transmitted the request PRS. Such measurements may be transmitted through PSSCH data.

PRS multiplexing related information: The PRS multiplexing information may be included in an SIB as system information or may be additionally included in the 2nd-stage SCI as follows. Specifically, the 2nd-stage SCI may additionally include information indicating a form in which the PRS is multiplexed with HARQ-feedback information, information indicating whether the PRS performs a frequency-hopping operation, and/or information indicating how many times the PRS is repeatedly transmitted.

TRTD information: The TRTD information is time information used by a UE to measure distance, indicating time until a UE participating in positioning to transmit the response PRS as a response after receiving the request PRS. Such measurement may be transmitted through PSSCH data.

Figure 17:
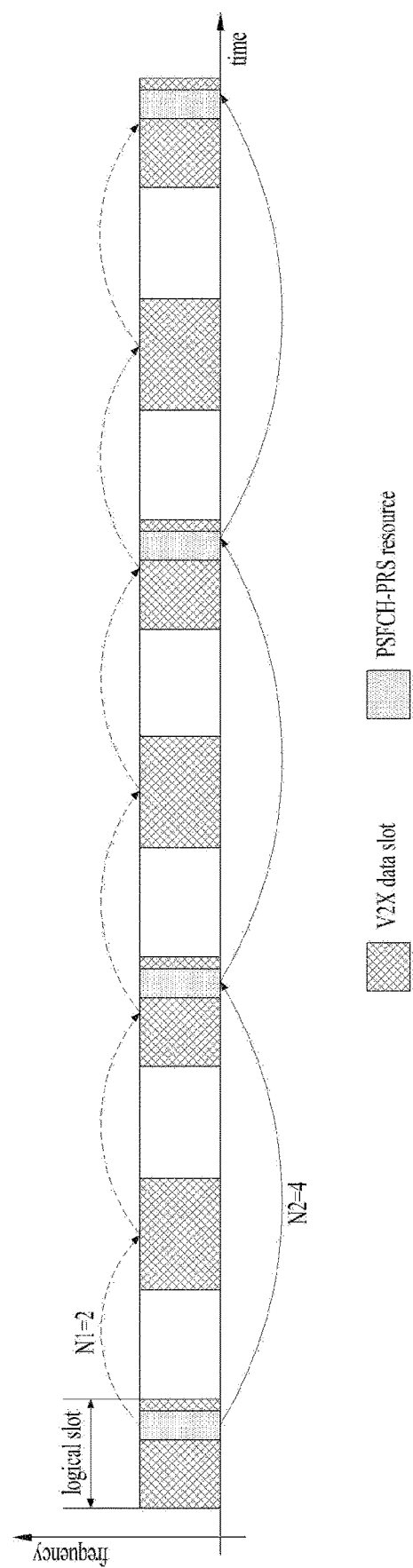
FIG. 17 is a diagram illustrating reservation information related to the period and number of PRS transmissions.

FIG. 17 is a diagram illustrating reservation information related to the period of PRS transmission and number of PRS transmissions.

Referring to FIG. 17, a V2X data slot is a slot reserved for V2X data communication and includes PSCCH and PSSCH resources for SPCI transmission. A PSFCH-PRS resource represents a resource reserved for V2X data communication and simultaneously reserved for PRS transmission. The PSCCH and PSSCH resources for SPCI transmission may be dynamically allocated or statically allocated as appreciated from the above description. As illustrated in FIG. 17, N1 indicates a V2X data communication transmission period and N2 indicates a PRS transmission period. The PRS transmission period may be equal to or greater than the V2X data communication transmission period. The number of PRS transmissions may be equal to or smaller than the number of V2X data communication transmissions.

Figure 18:
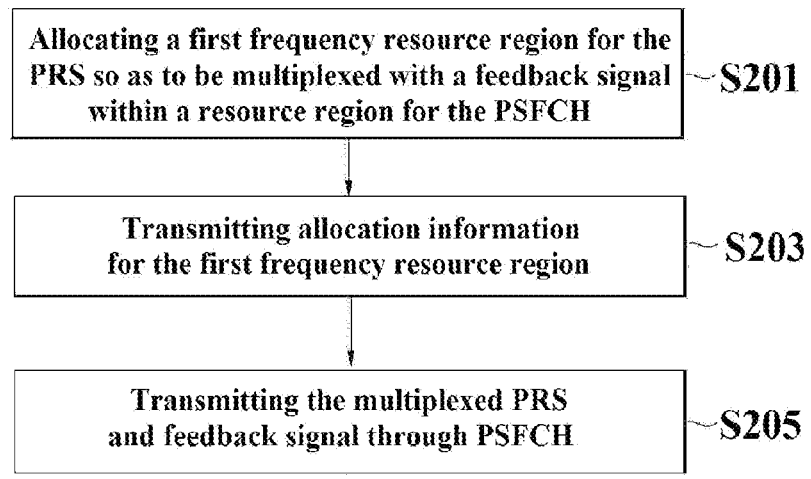
FIG. 18 is a diagram illustrating a method in which a first UE transmits a PRS through a PSFCH.

FIG. 18 is a diagram illustrating a method in which a first UE transmits a PRS through a PSFCH.

Referring to FIG. 18, the first UE may allocate a first frequency resource region for the PRS so that the PRS may be multiplexed with a feedback signal within a resource region for the PSFCH (S201). Here, a type in which the PRS and the feedback signal are multiplexed may be any one of a comb type, a first burst type, a second burst type, and No-multiplexing as described above. In addition, a resource region for the PSFCH may consist of one OFDM symbol. The first frequency resource region may include continuous RBs or frequency resources in the frequency domain.

The first UE also allocates a second frequency resource region for the feedback signal within the resource region for the PSFCH. The first frequency resource region and the second frequency resource region may be multiplexed to be distinguished in the frequency domain.

Specifically, when the multiplexing type is the comb type, a plurality of first frequency resource regions and a plurality of second frequency resources may be allocated in the resource region for the PSFCH as illustrated in FIG. 11(a). The plurality of first frequency resource regions and the plurality of second frequency resource regions may be allocated to cross each other in the frequency domain.

Alternatively, when the multiplexing type is the first burst type, two second frequency resource regions and one first frequency resource region may be included in the resource region for the PSFCH as illustrated in FIG. 11(b). The first frequency resource region may be allocated between the two second frequency resource regions. Alternatively, when the multiplexing type is the second burst type, one first frequency resource region and one second frequency resource region may be allocated in the resource region for the PSFCH as illustrated in FIG. 11(c). The first frequency resource region may be contiguously allocated at one end of the second frequency resource region. Alternatively, in order to minimize interference between the feedback signal and the PRS, a guard RE may be further included between the first frequency resource region and the second frequency resource region.

Alternatively, when the multiplexing type is the No-multiplexing type, only the first frequency resource region may be allocated in the resource region for the PSFCH as illustrated in FIG. 11(d). The No-multiplexing type has the largest number of consecutive frequency resources included in the first frequency resource region among the multiplexing types and may provide the highest positioning performance.

Alternatively, the multiplexing type may be determined based on the channel state of the PSFCH and/or the speed of the first UE. For example, when the channel state of the PSFCH is less than a preconfigured threshold state or the speed of the first UE is equal to or greater than a preset threshold, the multiplexing type may be determined as the first burst type or the second burst type. Alternatively, when the channel state of the PSFCH is less than the preconfigured threshold state or the speed of the first UE is equal to or greater than the preconfigured threshold, the multiplexing type may be determined as the No-multiplexing type. For example, when the channel state of the PSFCH is deteriorated or the speed of the first UE is greater than or equal to the preconfigured threshold, the first UE may allocate only the first frequency resource region for the PRS in the PSFCH.

Alternatively, when the channel state of the PSFCH is greater than or equal to the preconfigured threshold or the speed of the first UE is less than the preconfigured threshold speed, the multiplexing type may be determined as the comb type. That is, as the number of continuous frequency resources in the first frequency resource region in which the PRS is transmitted increases, the positioning performance based on the PRS increases. Therefore, when the channel state deteriorates or when the channel state is likely to deteriorate due to an increase in the speed of the first UE, the multiplexing type may be determined to be the first burst type or the second burst type in order to improve positioning performance.

Next, the first UE may transmit allocation information about the first frequency resource region allocated for the PRS and/or about the second frequency resource region allocated for the feedback signal to a peer UE or the second UE (S203). Here, the allocation information may be transmitted to the second UE as SCI and may be transmitted through a PSCCH as 1st-stage SCI or piggybacked on a PSSCH and transmitted as 2nd-stage SCI. Alternatively, the 1st-stage SCI may further include indication information indicating whether the allocation information is transmitted in the 2nd-stage SCI, and the allocation information may be transmitted in the 2nd-stage SCI according to the indication information.

The allocation information may provide information about PRS transmission in the PSFCH as a specific multiplexing type to the peer UE or the second UE. In addition, the allocation information may further include information about a starting frequency of the first frequency resource region for specifying the location of a frequency resource at which the PRS is transmitted and about the size of the first frequency resource region. Here, the information about the size of the first frequency resource region may be determined based on the multiplexing type and/or the size of a preconfigured frequency resource for feedback information included in the feedback signal (i.e., m-PRB preconfigured for transmission of X-bit PSFCH-feedback information).

For example, the size of the first frequency resource region may be configured to be an integer multiple of the size of the preconfigured frequency resource. The size of the integer multiple may be determined according to the multiplexing type. For example, when the multiplexing type is the comb type, the size of the first frequency resource region may be the same as the size of the preconfigured frequency resource. Alternatively, when the multiplexing type is a burst type, the integer multiple may be determined in consideration of the size of the second frequency resource region required for transmission of the feedback information. For example, when the size of the preconfigured frequency resource is 3 PRBs, the size of the first frequency resource region is 12 PRBs, and 25 PRBs are included in the resource region for the PSFCH, the integer multiple may be determined as 4 based on 13 PRBs excluding 12 PRBs from the resource region for the PSFCH. Meanwhile, the remaining 1 PRB may be configured as a guard RB between the first frequency resource region and the second frequency resource region.

Alternatively, the allocation information may include information about whether the first frequency resource region for the PRS is allocated to the PSFCH, a period at which the PRS is transmitted through the PSFCH, information about whether CDM is applied, information about whether frequency hopping is applied, information about whether the PRS is repeatedly transmitted, information about the number of slots (or logical slots) involved in PRS repetition and PRS hopping, a PRS mode indicator, a gap G between a request PRS and a response PRS, information about a request PRS ID and/or a response PRS ID, and/or information about positioning priority.

Next, the first UE may transmit the feedback signal and the PRS through the PSFCH based on the allocation information (S205). That is, the PRS may be multiplexed with the feedback signal according to the allocation information and then transmitted through the PSFCH.

Alternatively, the PRS may be transmitted with a preconfigured PRS pattern in the first frequency resource region. The PRS pattern or the PRS pattern ID may be preconfigured in consideration of a frequency offset of a PRS starting RE (or PRS starting RB), a base sequence, and a cyclic shift. The PRS pattern ID may be preconfigured based on at least one of a movement speed of the first UE and/or a channel state related to the PSFCH.

Alternatively, the PRS may be repeatedly transmitted by applying frequency hopping in units of N slots. For example, the PRS may be transmitted by being cyclically shifted by a k-RE in every N slot. As illustrated in FIGS. 12(a) and 12(c), the first frequency resource region may also be frequency-hopped according to frequency hopping. That is, the PRS may be transmitted by applying frequency hopping in the first frequency resource region or may be transmitted in the frequency-hopped first frequency resource region. Here, a hopping pattern applied to the PRS or the first frequency resource region may be determined based on a frequency hopping pattern preconfigured for the feedback signal. Alternatively, when k is 0, the PRS may be repeatedly transmitted in units of N slots without applying frequency hopping thereto.

Figure 19:
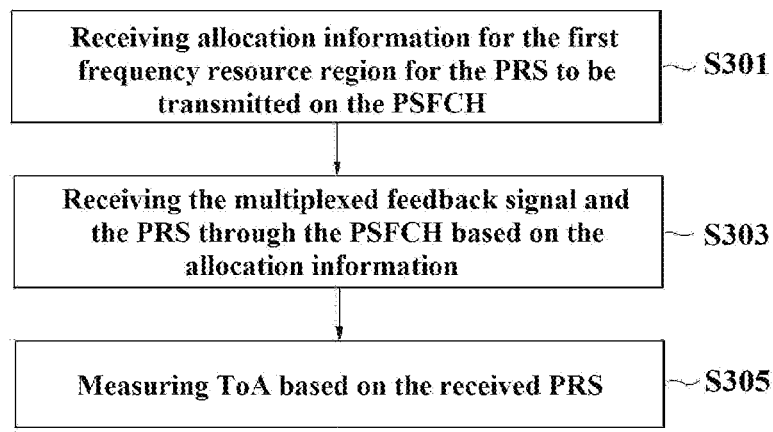
FIG. 19 is a diagram illustrating a method in which a second UE receives a PRS through a PSFCH.

FIG. 19 is a diagram illustrating a method in which a second UE receives a PRS through a PSFCH.

Referring to FIG. 19, the second UE may receive allocation information about a first frequency resource region for the PRS to be transmitted through the PSFCH from a first UE (S301). The allocation information may further include information about a second frequency resource region for a feedback signal to be transmitted by being multiplexed with the PRS. Each of the first frequency resource region and the second frequency resource region is a region including continuous frequency resources in the frequency domain.

The allocation information may include information about a multiplexing type of the PRS and the feedback signal that are transmitted on the PSFCH through multiplexing. The allocation information may further include information about a starting frequency of the first frequency resource region for specifying the location of a frequency resource at which the PRS is transmitted on the PSFCH and about the size of the first frequency resource region. In this case, the second UE may specify the first frequency resource region in which the PRS will be transmitted and/or the second frequency resource region in which the feedback signal will be transmitted, in a resource region for the PSFCH, based on the information about the multiplexing type and the information about the starting frequency and size of the first frequency resource region.

Here, the information about the size of the first frequency resource region, included in the allocation information, may be determined based on the multiplexing type and/or the size of a preconfigured frequency resource for feedback information included in the feedback signal (i.e., an m-PRB preconfigured for X-bit PSFCH-feedback information transmission). For example, the size of the first frequency resource region may be configured to be an integer multiple of the size of the preconfigured frequency resource. Alternatively, the size of the integer multiple may be determined according to the multiplexing type.

Alternatively, the allocation information may include information about whether the first frequency resource region for the PRS is allocated to the PSFCH, a period at which the PRS is transmitted through the PSFCH, information about whether CDM is applied, information about whether frequency hopping is applied, information about whether the PRS is repeatedly transmitted, information about the number of slots (or logical slots) involved in PRS repetition and PRS hopping, a PRS mode indicator, a gap G between a request PRS and a response PRS, information about a request PRS ID and/or a response PRS ID, and/or information about positioning priority.

Next, the second UE may receive the multiplexed feedback signal and PRS through the PSFCH based on the allocation information (S303). Here, the PSFCH consists of one OFDM symbol, and the PRS and the feedback signal may be received by being multiplexed through FDM according to the multiplexing type included in the allocation information.

Specifically, when the multiplexing type is the comb type, the second UE may receive the PRS and the feedback signal through the PSFCH in a plurality of first frequency resource regions and a plurality of second frequency resource regions. The plurality of first frequency resource regions and the plurality of second frequency resource regions intersect each other in the frequency domain within the PSFCH as illustrated in FIG. 11(a), and a frequency interval between the plurality of first frequency resource regions corresponds to a frequency size of the second frequency resource region.

Alternatively, when the multiplexing type is the first burst type, the resource region for the PSFCH may be composed of two second frequency resource regions and one first frequency resource region. In this case, the second UE may receive the feedback signal in the two second frequency resource regions and receive the PRS in the one first frequency resource region. Here, the first frequency resource region may be allocated between the two second frequency resource regions. Alternatively, in order to minimize interference between the feedback signal and the PRS, a guard RE may be further included between the first frequency resource region and the second frequency resource region.

Alternatively, when the multiplexing type is the second burst type, the resource region for the PSFCH may be composed of one first frequency resource region and one second frequency resource region as illustrated in FIG. 11(c). Here, the first frequency resource region may be contiguously allocated at one end of the second frequency resource region. Alternatively, in order to minimize interference between the feedback signal and the PRS, a guard RE may be further included between the first frequency resource region and the second frequency resource region.

Alternatively, when the multiplexing type is the No-multiplexing type, only the first frequency resource region may be allocated to the resource region for the PSFCH as illustrated in FIG. 11(d). Since the No-multiplexing type has the largest number of consecutive frequency resources included in the first frequency resource region among the multiplexing types, the highest positioning performance may be provided.

Next, the second UE may measure TOA based on the received PRS (S305). Here, when the PRS is repeatedly received at a specific period, the second UE may measure TOA by combining the repeatedly received PRSs.

Alternatively, the second UE may repeatedly receive the PRS that is repeatedly transmitted in units of N slots by applying frequency hopping. For example, the repeatedly received PRS may be transmitted by being cyclically shifted by a k-RE in every N slot. The second UE may combine the repeatedly received PRSs and perform positioning based on the combined PRSs. That is, the second UE may combine all the PRSs received in the logical slots related to PRS frequency hopping and make the distance between the PRSs close, thereby improving TOA accuracy and performance.

Alternatively, the second UE may adjust the number of combined PRSs based on a movement speed thereof or a channel state measured for the PSFCH. For example, the second UE may reduce the number of combined PRSs when the movement speed thereof is equal to or greater than a predetermined threshold speed or the channel state measured for the PSFCH is less than a predetermined channel state. Alternatively, the number K of PRSs that may be combined may be predefined according to the movement speed of the second UE and according to the degree of time selectivity and frequency selectivity of the channel. For example, when the moving speed of the second UE is equal to or greater than the predetermined threshold value or the channel state is less than the predetermined channel state, K may be set to be smaller than N.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 20:
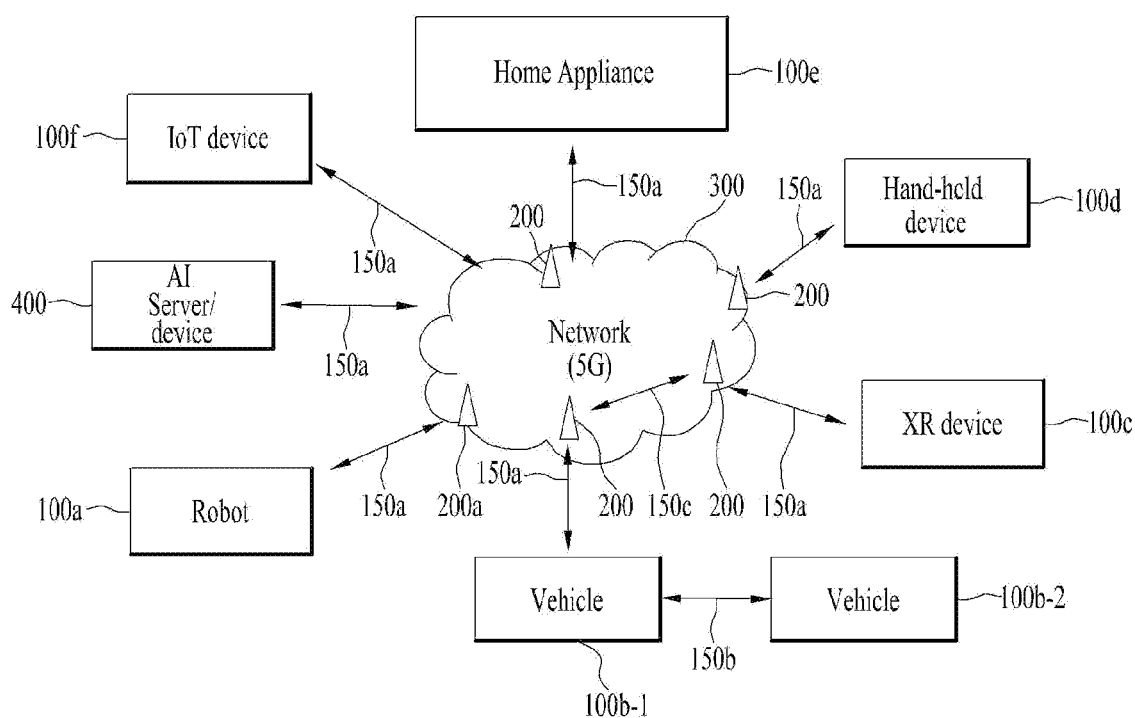
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 21:
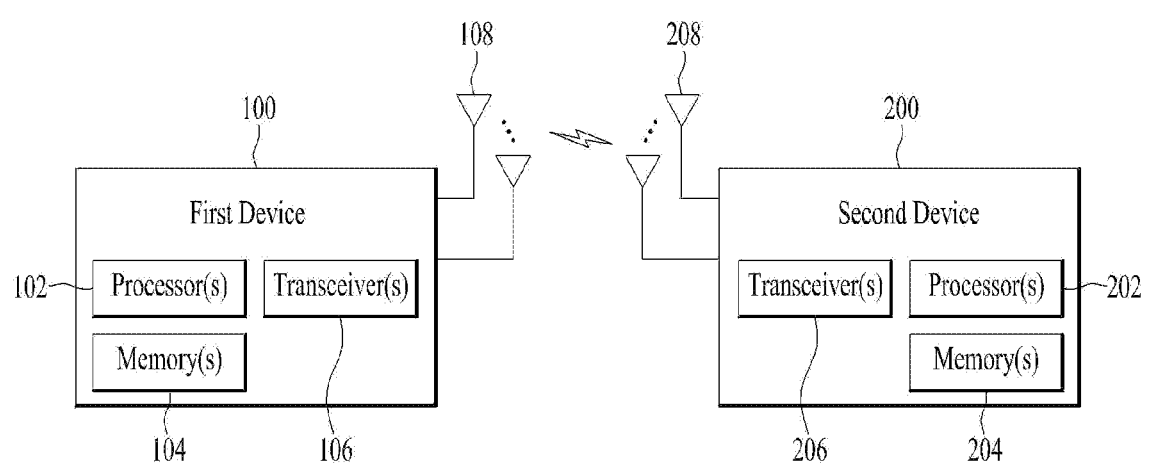
FIG. 21 illustrates wireless devices applicable to the present disclosure.

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include the processor(s) 102 and the memory(s) 104, connected to the RF transceiver(s). The memory(s) 104 may include at least one program capable of performing operations related to the embodiments described with reference to FIGS. 11 to 19.

The processor(s) 102 may allocate a first frequency resource region for a PRS and a second frequency resource region for a feedback signal so that the PRS and the feedback signal may be multiplexed in a resource region for a PSFCH, and control the RF transceiver(s) to transmit allocation information about the first frequency resource region and the second frequency resource region and to transmit the PRS and the feedback signal through the PSFCH based on the allocation information. The size of the first frequency resource region may be determined based on the size of a preconfigured frequency resource for the feedback signal and on a multiplexing type. The allocation information may include information about the multiplexing type, the size of the first frequency resource region, and a starting frequency of the first frequency resource.

Alternatively, a chipset including the processor(s) and the memory(s) 104 may be configured. The chipset may include at least one processor, and at least one memory operably connectable to the at least one processor and causing, when executed, the at least one processor to perform operations including allocating a first frequency resource region for a PRS and a second frequency resource region for a feedback signal so that the PRS and the feedback signal are multiplexed in a resource region for the PSFCH, and controlling the RF transceiver(s) to transmit allocation information about the first frequency resource region and the second frequency resource region and to transmit the PRS and the feedback signal through the PSFCH based on the allocation information. The size of the first frequency resource region may be determined based on the size of a preconfigured frequency resource for the feedback signal and on a multiplexing type. The allocation information may include information about the multiplexing type, the size of the first frequency resource region, and a starting frequency of the first frequency resource. The operations may include transmitting the PRS according to the embodiments described with reference to FIGS. 11 to 19, based on a program included in the memory(s) 104.

Alternatively, a computer-readable storage medium including at least one computer program that causes the at least one processor to perform operations is provided. The operations include allocating a first frequency resource region for a PRS and a second frequency resource region for a feedback signal so that the PRS and the feedback signal are multiplexed in a resource region for the PSFCH, transmitting allocation information about the first frequency resource region and the second frequency resource region, and transmitting the PRS and the feedback signal through the PSFCH based on the allocation information. The size of the first frequency resource region may be determined based on the size of a preconfigured frequency resource for the feedback signal and on a multiplexing type. The allocation information may include information about the multiplexing type, the size of the first frequency resource region, and a starting frequency of the first frequency resource. The operations may include transmitting the PRS according to the embodiments described with reference to FIGS. 11 to 19, based on a program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Alternatively, the processor(s) may receive allocation information about a first frequency resource region allocated for the PRS and a second frequency resource region allocated for a feedback signal, in a resource region for the PSFCH, and receive the PRS and the feedback signal through the PSFCH based on the allocation information. The allocation information may include information about the size of the first frequency resource region, determined based on the size of a preconfigured frequency resource for the feedback signal and on a multiplexing type, and information about the multiplexing type and a starting frequency of the first frequency resource. The operations may include receiving the PRS according to the embodiments described with reference to FIGS. 11 to 19, based on a program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
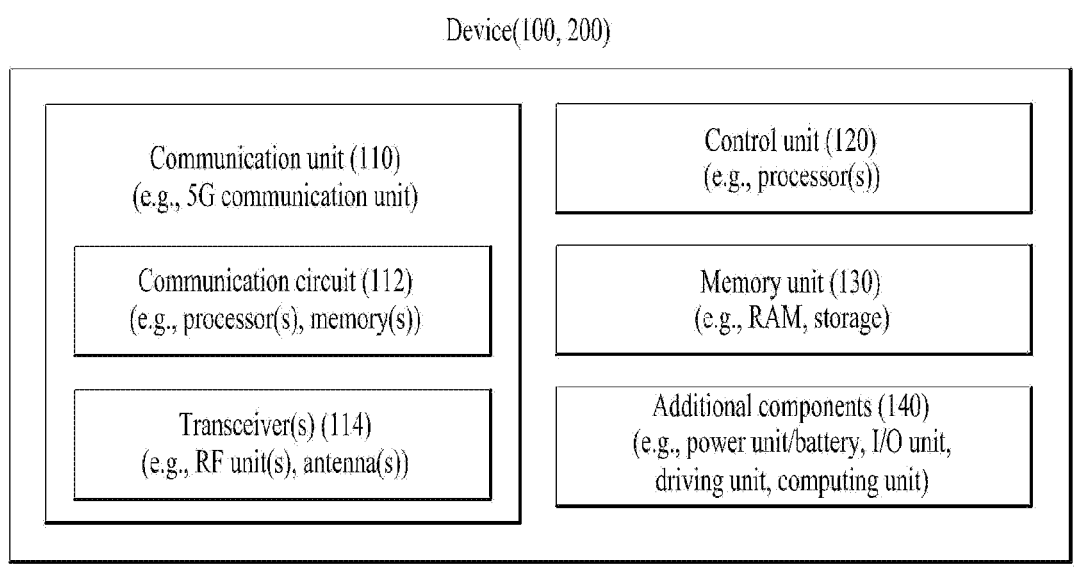
FIG. 22 illustrates another example of a wireless device to which the present disclosure is applied. The wireless device may be implemented in various forms according to use-examples/services.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 20), the vehicles (100*b*-1 and 100*b*-2 of FIG. 20), the XR device (100*c* of FIG. 20), the hand-held device (100*d* of FIG. 20), the home appliance (100*e* of FIG. 20), the IoT device (100*f* of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 23:
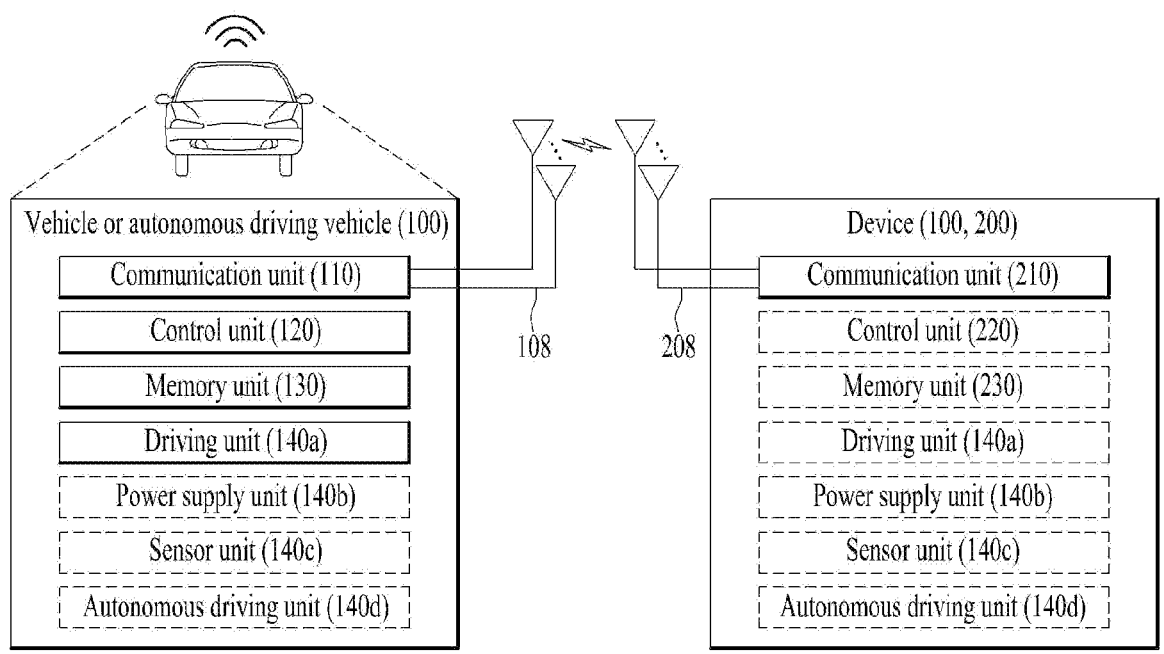
FIG. 23 illustrates a vehicle or an autonomous driving vehicle applied to the present disclosure.

Examples of Vehicles or Autonomous Vehicles to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method comprising:
allocating, by a first user equipment (UE), a first frequency resource region for a PRS (positioning reference signal) so that the PRS is multiplexed with a feedback signal in a resource region for a physical feedback channel for a direct communication between UEs;
transmitting, by the first UE, allocation information on the first frequency resource region; and
transmitting, by the first UE, the PRS and the feedback signal through the physical feedback channel based on the allocation information,
wherein a size of the first frequency resource region is determined based on a size of a preconfigured frequency resource for the feedback signal and on a multiplexing type, and
wherein the allocation information includes information on the multiplexing type, the size of the first frequency resource region, and a starting frequency of the first frequency resource region.

2. The method of claim 1, wherein the allocation information is transmitted through a physical control channel for direct communication between UEs or is transmitted by being piggybacked on a physical shared channel for direct communication between UEs.

3. The method of claim 1, wherein the first UE transmits, through a physical control channel for direct communication between UEs, information as to whether the allocation information is transmitted by being piggybacked on a physical shared channel for direct communication between UEs.

4. The method of claim 1, wherein a plurality of first frequency resource regions is allocated in the resource region for the physical feedback channel based on the multiplexing type of a comb type, and each of the plurality of first frequency resource regions is separated from each other by a frequency size of a second frequency resource region allocated to the feedback signal in the resource region for the physical feedback channel.

5. The method of claim 1, wherein only one first frequency resource region is allocated in the resource region for the physical feedback channel based on the multiplexing type of a burst type, and the first frequency resource region is separated from a second frequency resource region allocated to the feedback signal by a preconfigured guard resource element in the resource region for the physical feedback channel.

6. The method of claim 5, wherein the burst type includes a first burst type and a second burst type, and the first frequency resource region is allocated between second frequency resource regions based on the multiplexing type of the first burst type.

7. The method of claim 1, wherein a PRS pattern identifier, ID, for the PRS is determined based on at least one of a movement speed of the UE or a channel state related to the physical feedback channel.

8. The method of claim 1, wherein, based on repeated transmission of the PRS by the UE, the PRS is transmitted in the first frequency resource region which is frequency-hopped based on a preconfigured hopping pattern.

9. The method of claim 8, wherein the preconfigured hopping pattern is preconfigured based on a hopping pattern for the feedback signal.

10. A first user equipment (UE) comprising:
a radio frequency, RF, transceiver; and
a processor connected to the RF transceiver,
wherein the processor allocates a first frequency resource region for a PRS (positioning reference signal) so that the PRS is multiplexed with a feedback signal in a resource region for a physical feedback channel for a direct communication between UEs, and controls the RF transceiver to transmit allocation information on the first frequency resource region and to transmit the PRS and the feedback signal through the physical feedback channel based on the allocation information, and
wherein a size of the first frequency resource region is determined based on a size of a preconfigured frequency resource for the feedback signal and on a multiplexing type, and the allocation information includes information on the multiplexing type, the size of the first frequency resource region, and a starting frequency of the first frequency resource.

11. A non-transitory computer-readable storage medium including at least one computer program comprising:
the at least one computer program causes at least one processor to perform operations; and
the computer-readable storage medium stores the at least one computer program,
wherein the operations include:
allocating a first frequency resource region for a PRS (positioning reference signal) so that the PRS is multiplexed with a feedback signal in a resource region for a physical feedback channel for a direct communication between UE (user equipment) s, transmitting allocation information on the first frequency resource region, and transmitting the PRS and the feedback signal through the physical feedback channel based on the allocation information, and
wherein a size of the first frequency resource region is determined based on a size of a preconfigured frequency resource for the feedback signal and on a multiplexing type, and the allocation information includes information on the multiplexing type, the size of the first frequency resource region, and a starting frequency of the first frequency resource.

* * * * *